(12) United States Patent
Roedel et al.

(10) Patent No.: US 11,683,356 B2
(45) Date of Patent: Jun. 20, 2023

(54) INTELLIGENTLY IDENTIFYING AND PROMOTING A MEETING PARTICIPANT IN AN ONLINE MEETING

(71) Applicant: Microsoft Technology Licensing, LLC, Redmond, WA (US)

(72) Inventors: Dominic Roedel, Prague (CZ); Jakub Brindza, Hrusov (SK); Mario Novoselec, Gradec (HR)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/939,181

(22) Filed: Jul. 27, 2020

(65) Prior Publication Data

US 2022/0030042 A1    Jan. 27, 2022

(51) Int. Cl.
*H04L 65/403* (2022.01)
*G06F 3/0484* (2022.01)

(52) U.S. Cl.
CPC .......... *H04L 65/403* (2013.01); *G06F 3/0484* (2013.01)

(58) Field of Classification Search
CPC .............................. H04L 65/403; G06F 3/0484
See application file for complete search history.

(56) References Cited

U.S. PATENT DOCUMENTS

| | | |
|---|---|---|
| 6,931,113 B2 | 8/2005 | Ortel |
| 8,358,599 B2 | 1/2013 | Shaffer et al. |
| 8,558,868 B2 | 10/2013 | Prentice |
| 8,890,926 B2 | 11/2014 | Tandon et al. |
| 8,913,103 B1 | 12/2014 | Sargin et al. |
| 9,041,764 B2 | 5/2015 | Wang et al. |
| 9,049,033 B2 | 6/2015 | Lemmey et al. |
| 9,300,916 B1 | 3/2016 | Breedvelt-Schouten et al. |
| 9,369,667 B2 | 6/2016 | Diao |
| 9,438,819 B2 | 9/2016 | Van Broeck |

(Continued)

OTHER PUBLICATIONS

"Using Chat Mentions—Zoom Help Center", Retrieved from: https://support.zoom.us/hc/en-us/articles/360037567431-Using-Chat-Mentions, Retrieved on Jan. 24, 2020, 5 Pages.

(Continued)

*Primary Examiner* — Andrew T Chiusano
(74) *Attorney, Agent, or Firm* — NovoTechIP International PLLC

(57) ABSTRACT

A system and method for identifying and promoting a user in an online meeting based on a mention of a username in a chat/audio session. The system is configured to identify meeting participants, detect a first signal that a first participant has mentioned a name of a second participant in the chat/audio session, cause a user interface to display on each client device of participants, identify a first location on the user interface at which a representation of the first/second participant is displayed, the first location being associated with a first ranking value, and promote a display location of the first/second participant by moving the representation of the first/second participant from the first location for display to a second location on the user interface, the second location being associated with a second ranking value representing a higher ranking than that represented by the first ranking value of the first location.

31 Claims, 14 Drawing Sheets

(56) References Cited

U.S. PATENT DOCUMENTS

| | | | |
|---|---|---|---|
| 2005/0099492 A1* | 5/2005 | Orr | H04N 7/147 348/14.08 |
| 2007/0011239 A1* | 1/2007 | Fujioka | H04L 67/24 709/204 |
| 2007/0100937 A1 | 5/2007 | Burtner et al. | |
| 2011/0267422 A1 | 11/2011 | Garcia et al. | |
| 2013/0010049 A1* | 1/2013 | Mostafa | H04L 65/4084 348/14.01 |
| 2013/0106985 A1* | 5/2013 | Tandon | H04L 12/1827 348/14.08 |
| 2013/0169742 A1* | 7/2013 | Wu | H04N 7/152 348/E7.083 |
| 2016/0227165 A1* | 8/2016 | Moorjani | H04L 12/1822 |
| 2018/0330736 A1* | 11/2018 | Faulkner | H04L 67/22 |
| 2018/0337963 A1* | 11/2018 | Faulkner | H04L 67/26 |
| 2019/0379839 A1 | 12/2019 | Hellerud et al. | |
| 2021/0240725 A1* | 8/2021 | Shortt | G06F 16/2228 |
| 2021/0385184 A1* | 12/2021 | Dalonzo | G06F 3/04817 |
| 2021/0406804 A1* | 12/2021 | Hamid | G06Q 10/103 |

OTHER PUBLICATIONS

"Webex Teams | Get Someone's Attention with @Mentions", Retrieved from: https://help.webex.com/en-us/p5k20o/Webex-Teams-Get-Someone-s-Attention-with-Mentions, Retrieved on Jan. 24, 2020, 2 Pages.

Fang, et al., "Method of Passive Participant Tracking in Video Conference", In Technical Disclosure Commons, Dec. 21, 2018, 11 Pages.

Larcker, et al., "Detecting Deceptive Discussions in Conference Calls", In Journal of Accounting Research, vol. 50, No. 2, May 2012, pp. 495-540.

* cited by examiner

INTELLIGENTLY IDENTIFYING AND PROMOTING A MEETING PARTICIPANT IN AN ONLINE MEETING

TECHNICAL FIELD

The present application is directed to systems and methods of virtual conference management, and in particular to systems and methods of identifying and promoting a user in an online meeting based on a mention of the user in at least one of a chat session or an audio session associated with the online meeting.

BACKGROUND

Virtual conferencing allows two or more people at multiple places to communicate with each other through video, audio, and text transmissions in an online meeting, which is particularly useful when a face-to-face meeting is unavailable or burdensome. Currently, the online meeting solutions show representations or icons of meeting participants in an online meeting mostly in a static layout. For example, pre-selected participants such as a presenter and an organizer may be displayed during the entire time of an online meeting. A static layout of the presentation cannot reflect the meeting progress. Even if a user was mentioned many times by many people in a chat session of the meeting and should be a focus of the meeting, this frequently mentioned user may not be made prominent and visible to other meeting participants on their displays due to the static layout and limited display space. Therefore, with current approaches, if a non-typical arrangement of presenting a participant (e.g., the frequently mentioned user) is needed, a viewer would need to manually manipulate the representation of the participant on his/her display. Hence, there is a need for a system and method for intelligently identifying and promoting a user for a dynamic display in an online meeting.

SUMMARY

In one aspect, a user promotion system for identifying and promoting a user in an online meeting based on a mention of the user in a chat session or an audio session associated with the online meeting includes a processor, and a memory, coupled to the processor, configured to store executable instructions. The instructions, when executed by the processor, cause the processor to identify a plurality of participants of an online meeting, the plurality of participants including a first participant and a second participant, detect, from data streams for the online meeting from client devices of the participants, a first signal that the first participant has mentioned a name of the second participant in at least one of the chat session or the audio session associated with the online meeting, cause a user interface for the online meeting to display on each of the client devices, wherein the user interface includes a plurality of display locations, each display location being associated with an assigned ranking value representing a ranking of the display location among the plurality of display locations, identify, from among the plurality of display locations, a first location on the user interface at which a representation of the first participant or the second participant is displayed, the first location being associated with a first assigned ranking value, and responsive to detecting the first signal, instruct one or more client devices to promote a display location of the first participant or the second participant on the user interface by moving the representation of the first participant or the second participant from the first location for display to a second location on the user interface, wherein the second location on the user interface is associated with a second assigned ranking value representing a higher ranking than that represented by the first assigned ranking value of the first location on the user interface.

In another aspect, a method of identifying and promoting a user in an online meeting based on a mention of the user in a chat session or an audio session associated with the online meeting includes identifying a plurality of participants of an online meeting, the plurality of participants including a first participant and a second participant, detecting, from data streams for the online meeting from client devices of the participants, a first signal that the first participant has mentioned a name of the second participant in at least one of the chat session or the audio session associated with the online meeting, causing a user interface for the online meeting to display on each of the client devices, wherein the user interface includes a plurality of display locations, each display location being associated with an assigned ranking value representing a ranking of the display location among the plurality of display locations, identifying, from among the plurality of display locations, a first location on the user interface at which a representation of the first participant or the second participant is displayed, the first location being associated with a first assigned ranking value, and responsive to detecting the first signal, instructing one or more client devices to promote a display location of the first participant or the second participant on the user interface by moving the representation of the first participant or the second participant from the first location for display to a second location on the user interface, wherein the second location on the user interface is associated with a second assigned ranking value representing a higher ranking than that represented by the first assigned ranking value of the first location on the user interface.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
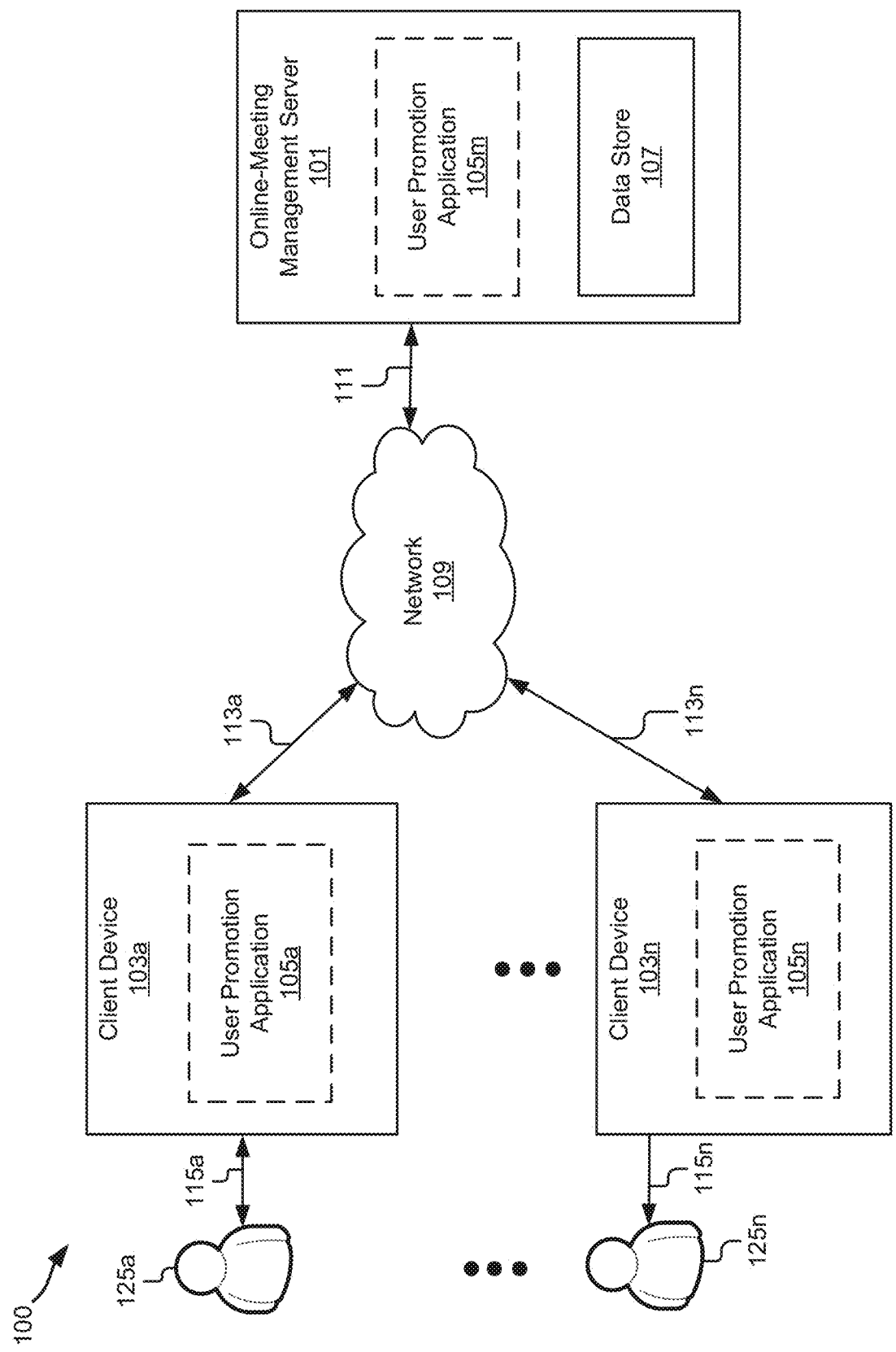
FIG. 1 is a block diagram of an example user promotion system.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

In an online meeting, a participant may see other participants on his/her display. These other participants may not include every other person in the meeting due to limitations in the available bandwidth and/or available display space. For example, a participant may only view information of a certain number of pre-selected users (e.g., a presenter, an organizer, etc.) in a user interface associated with the participant. As the online meeting progresses, the participant/attendee information displayed to a participant may or may not change. Some online meeting solutions may focus on the loudest talker, the most frequent talker, and/or the person gazing at the screen for the longest time in the meeting, and bring these particular participant(s) into focus and to other participants' attention. But such meeting solutions have a technical problem of only using verbal volume, frequency cues and/or eye-motion signals to identify the limited changes (i.e., focused participants) to the static layout of a participant's display. Moreover, the identified changes are not personalized for display to a specific viewing participant.

The present application provides a technical solution for identifying and promoting a user in an online meeting based on a mention of a username in at least one of a chat session or an audio session associated with the online meeting. The technical solution includes identifying a plurality of participants of an online meeting. The plurality of participants may include a first participant and a second participant. The technical solution may then detect a first signal that the first participant has mentioned a name of the second participant in at least one of the chat session or the audio session associated with the online meeting. Responsive to the detection of the first signal, the technical solution may promote a display location of the first participant or the second participant on the user interface on or more client devices by moving the representation of the first participant or the second participant from a first location for display to a second location on the user interface. Each display location may be associated with an assigned ranking value representing a ranking of the display location among the plurality of display locations. In one specific implementation, the second location on the user interface is associated with a second assigned ranking value representing a higher ranking than that represented by the first assigned ranking value of the first location on the user interface.

In some implementations, the technical solution may weigh and rank the mention of the first or second user as compared to other mentions of username(s) in the chat session or audio session. The weighing and ranking may be conducted based on frequency, context, user role, to determine the specific location and the representation for displaying the first or second user. The first or second user may be promoted locally and/or globally. Assuming the second user is being promoted, in a local promotion, the technical solution may only display the second user in the user interface of the first user who mentioned the second user. Depending on the context analysis, however, the technical solution may also display the second user globally in multiple user interfaces of multiple participants or all participants. For example, if the first user asks the second user to start a presentation and the second user shares a file for presentation, the system may glean from this information that the second user should be promoted to all participants of the meeting. Moreover, the technical solution may promote the first user who mentioned the second user for display on a user interface associated with the second user to facilitate the communication between the second user and the first user.

In some implementations, the promoted second user may not be a participant of the meeting. When the second user is mentioned by a participant in the chat session or audio session of the meeting, the technical solution would notify the second user to join the meeting and subsequently promote the second user for display globally on one or more user interfaces. In some cases, the technical solution may also notify the second user about his/her promotion before promoting the second user. This allows the second user to opt out of the promotion if he/she does not approve the promotion for any reason. In addition, the technical solution may allow different representations for the promoted user based on different contexts related to the mention of the promoted user.

The technical solution described in the present application addresses the technical problem of static display and achieves technical effects by providing a system and method for automatically rearranging icons or representations on graphical user interfaces. The technical solution allows a viewer to navigate quickly and efficiently to access data and activate a function on electronic devices with small screens, and therefore particularly improves graphical user interfaces for electronic devices with small screens. The technical effects at least include (1) improving the efficiency of using an electronic device by bringing together data of promoted user(s) for direct accessing by a viewer from a small screen; (2) improving the viewer's navigation speed; and (3) increasing relevancy and flexibility of the data displayed to the viewer on the small screen.

The technical solution allows data of promoted user(s) to be displayed globally or locally on one or more user interfaces such that a viewer can directly view and access the data from a user interface associated with an online meeting without opening any other applications, thereby improving the efficiency of using the electronic device. Also, the speed of the viewer's navigation through various views and windows can be improved because the viewer does not need to navigate to a required application, open it up, and then navigate within that application to enable the data of a promoted user to be seen. For example, the technical solution relieves the viewer from operations of searching for hidden information (e.g., in an overflow zone). Rather than parsing through multiple screens or options, a representation of the promoted user is automatically displayed to the viewer without manual operation. Moreover, the technical solution allows the dynamic identification of a promoted user as the online meeting progresses and makes the most relevant data (e.g., the representation of the promoted user) visible to the viewer. This increases the relevancy and flexibility of data displayed to the viewer without further operations from the viewer, thereby improving the efficiency of the viewer operating the electronic client devices. These technical effects, therefore, show an improvement in the functioning of computers, particularly those with small screens.

FIG. 1 is a block diagram of an example user promotion system 100. As shown, the system 100 includes an online-meeting management server 101 and one or more client devices 103a . . . 103n coupled for electronic communication via a network 109. It should be understood that the system 100 depicted in FIG. 1 is provided by way of example and the system 100 and/or further systems contemplated by this present disclosure may include additional and/or fewer components, may combine components and/or divide one or more of the components into additional components, etc. For example, the system 100 may include any number of online-meeting management servers 101, client devices 103a . . . 103n, or networks 109.

The network 109 may be a conventional type, wired and/or wireless, and may have numerous different configurations including a star configuration, token ring configuration, or other configurations. For instance, the network 109 may include one or more local area networks (LAN), wide area networks (WAN) (e.g., the Internet), public networks, private networks, virtual networks, mesh networks, peer-to-peer networks, and/or other interconnected data paths across which multiple devices may communicate. The network 109 may also be coupled to or include portions of a telecommunications network for sending data in a variety of different communication protocols. In some implementations, the network 109 includes Bluetooth® communication networks or a cellular communications network for sending and receiving data including via short messaging service (SMS), multimedia messaging service (MMS), hypertext transfer protocol (HTTP), direct data connection, WAP, email, etc.

The client devices 103a . . . 103n (or collectively client device 103) may include virtual or physical computer processors, memor(ies), communication interface(s)/device(s), etc., which along with other components of the client device 103 are coupled to the network 109 via signal lines 113a . . . 113n for communication with other entities of the system 100. In some implementations, the client device 103a . . . 103n, accessed by users 125a . . . 125n via signal lines 115a . . . 115n respectively, may send and receive data to and from other client device(s) 103 and/or the online-meeting management server 101, and may further analyze and process the data. For example, the client devices 103a . . . 103n may communicate with the online-meeting management server 101 to generate and update a user interface for display on each of the client devices 103a . . . 103n. Non-limiting examples of client device 103 may include a laptop computer, a desktop computer, a tablet computer, a mobile telephone, a personal digital assistant (PDA), a mobile email device, or any other electronic devices capable of processing information and accessing the network 109.

In some implementations, the client devices 103a . . . 103n include instances 105a . . . 105n of a user promotion application 105. The user promotion application 105 may intelligently and automatically identify a user based on detecting a mention of the user in a chat or audio session associated with an online meeting, and update one or more user interfaces associated with one or more client devices 103a . . . 103n for display a representation of the identified user at a specific location. The representation may be an image, a text or a symbol that uniquely identifies a participant on a user interface. The user promotion application 105 will be described in more detail below with reference to FIG. 2.

The online-meeting management server 101 is a computing device that communicates with one or more client devices 103 to host an online meeting and to process the data exchanged with the one or more client devices 103. In some implementations, the online-meeting management server 101 receives a request from the user 125a (e.g., a meeting organizer) via the client device 103a to establish a virtual space of an online meeting. The online-meeting management server 101 supports chat service, calling service, and other services so that multiple participants can hear, see, chat, and share data with each other in the virtual space. The online-meeting management server 101 may also track and analyze the communication messages used in the online meeting to instruct one or more client devices 103 to update the display with information of promoted user(s) in real-time. The online-meeting management server 101 is communicatively coupled to the network 109 via signal line 111.

As depicted, the online-meeting management server 101 also includes an instance of the user promotion application 105m. Each instance 105a . . . 105m may include one or more components of the user promotion application 105 depicted in FIG. 2, and may be configured to fully or partially perform the functionalities described therein depending on where the instance resides. In some implementations, the online-meeting management server 101 may be a cloud server that possesses larger computing capabilities and computing resources than the client device 103a, and therefore may perform more complex computation than the client device 103a can. For example, the online-meeting management server 101 may determine a promoted user based on a text or audio message and instruct one or more client devices 103 to generate/update a corresponding user interface for display. The online-meeting management server 101 may also include a data store 107 to store data received from multiple client devices 103 and any other data generated and required for implementing the functionalities related to the online-meeting management server 101.

Figure 2:
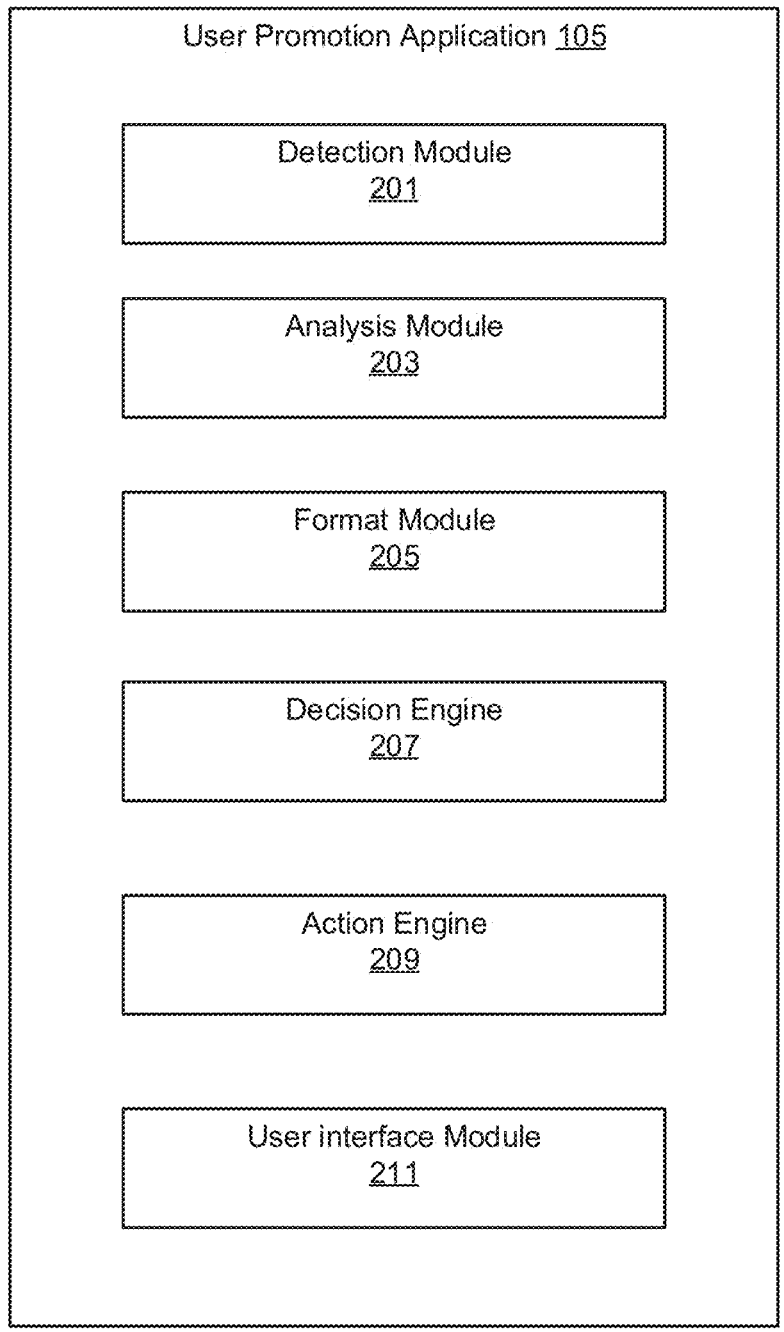
FIG. 2 is a block diagram of example components of a user promotion application.

FIG. 2 is a block diagram of example components of a user promotion application 105. The user promotion application 105 includes hardware and/or software logic for receiving data streams of an online meeting, detecting a signal that a first user mentions/tags a second user in a chat session/audio session of the online meeting, identifying one or more users that are interested in the mentioned/tagged second user, and displaying a representation of the second user at a prominent location on one or more user interfaces associated with one or more users. The one or more user interfaces include a user interface associated with the client device 103a accessed by the first user. The representation may be an image, a text, or a symbol that uniquely identifies the second user on the user interface.

A user interface displayed on a client device 103a may include multiple display locations. In some implementations, each display location on the user interface is assigned with a unique ranking value representing a ranking of the display location among the multiple display locations. In other implementations, the user interface may be divided into different hierarchies, for example, a primary area and a secondary area for displaying user representations. The secondary area includes an overflow zone. The locations of a same class, i.e., in the same area/zone, may share a same ranking value. For example, the ranking values are assigned to locations in the primary area, the non-overflow zone of the secondary area, and the overflow zone in descending order. If the second user has been displayed at a first location on the user interface of the first user before the first user mentioning the second user, the prominent location may be a second location associated with an assigned ranking value representing a higher ranking than that represented by the assigned ranking value of the first location. In some implementations, the first location and the second location each have a unique ranking. In other implementations, the first and second locations are located in different display areas.

In some implementations, the second user may not currently be displayed on the user interface associated with the client device 105a. For example, the second user is not a participant in the online meeting. In this scenario, the prominent location may be a location with an assigned ranking value that exceeds a threshold ranking value. By displaying a representation of the second user at the prominent location, the user promotion application 105 may make the second user visible to the first user and/or other users without any manual operation, thereby improving user navigation experience and increasing operation efficiency.

In some implementations, the user promotion application 105 includes a detection module 201, an analysis module 203, a format module 205, a decision engine 207, an action engine 209, and a user interface module 211. The detection module 201 detects a mention signal from a data stream of an online meeting. The mention signal may be a chat message in a chat session associated with the online meeting. In the chat message, the first user may have mentioned or tagged the name of a second user, i.e., the first user has "@name" mentioned the second user in a chat. In other implementations, the mention signal is a verbal message in an audio session associated with the online meeting. In the audio message, the first user may have mentioned the name of the second user, i.e., the first user has "@name" mentioned the second user in an audio conversation/chat. For simplicity, the description below will mainly focus on identifying and promoting a user based on the mention signal detected from a chat session. However, it should be recognized that such description is also applied to an audio session scenario. Also, the mention signal is referred to as the first user @name mention the second user below for consistency. However, other implementations are contemplated. For example, the second user may @name mention the first user. For yet another example, the first or second user may @name mention the names of multiple users in audio session or a chat session associated with the online meeting.

In some implementations, the detection module 201 may be incorporated with a communication module (not shown) to receive the data stream including audio, video, image, and text data transmitted among participants in the online meeting, and identify participants of the online meeting. To identify the participants, the detection module 201 may detect the signal(s) about a new user joining the online meeting or the signal(s) about an existing user leaving the online meeting. The detection module 201 may also extract chat message(s) associated with the chat session of the online meeting from the received data, parse the chat message(s), and identify the mention signal that a first user mentions the name of the second user in the chat session. In some implementations, the received data may be encrypted and the detection module 201 may decrypt the data to detect the mention signal. In some implementations, the detection module 201 may also transcribe the data stream received from the audio conversation to text messages and detect the mention signal based on the text messages.

The mention signal indicates that the mentioned/tagged second user is prominent to the mentioning/tagging first user and/or to other participant(s). The identification of the other participant(s) will be described below with reference to the decision engine 207. Upon detecting the mention signal, the detection module 201 may notify other modules/engines of the user promotion application 105 to highlight or promote the second user. The highlight or promotion of the second user may be done, in one example, by displaying a representation of the second user in a prominent location (e.g., the central portion) of a user interface associated with the first user and/or the other participant(s). For example, if user JD sends a chat message "@MA, can you please prepare to talk next?" a thumbnail image of user MA shown at a first location of JD's user interface may be enlarged and moved to display at a second location of JD's user interface so that JD may easily view how MA reacts to his/her message, thereby facilitating the communication between two users. In one implementation, the JD's user interface may include multiple display areas and each of the display area may in turn include multiple display locations. For example, the JD's user interface may include a primary display area and a secondary display area. Each display area may include a unique ranking value which is shared among the locations associated with that specific area. For example, the first display location may be associated with the primary display area and the second display location may be associated with the secondary display area. In another implementation, each display location may be associated with a unique ranking value. In either case, the second display area may be associated with a higher ranking value than the first display area to allow for promotion of the representation of the second user upon detection of the mention signal.

The mention signal may also be an indicator of promoting the representation of the mentioning first user to a prominent location on a user interface of the mentioned second user. Depending on whether the first user has been displayed at a first location on the user interface of the second user before the detection of the mention signal, the prominent location may be a second location associated with an assigned ranking value representing a higher ranking than that represented by the assigned ranking value of the first location, or a location with an assigned ranking value exceeding a threshold ranking value. In some implementations, the promotion of the first user on the second user's display reminds the second user to timely react to the message. In other implementations, the second user may already be displayed at a location of a highest-ranking value and cannot be promoted to a more prominent position. As a result, the first user is promoted and the promotion of the first user will similarly remind users to communicate with each other. Although the description below is mainly based on displaying the promoted second user for simplicity, it should be recognized that the first user may also be promoted.

In some implementations, the detection module 201 may also extract and identify other signals such as eye motion signals, gesture signals, etc., from the data streams of the online meeting. The detection module 201 transmits different types of signals to the analysis module 203 and the format module 205 for further processing. The analysis module 203 analyzes the received mention signal and/or other signals to generate an analysis result. The analysis result includes information used for determining on which user interface(s), at which location of the user interface(s), and at what time to display a representation of a promoted user. In some implementations, the analysis module 203 transmits the analysis result to the decision engine 207 and the action engine 209.

In keeping with the previous example, the mention signal indicates a first user @mentions a second user in the chat session/audio session of an online meeting. The first user may be a participant of the online meeting, but the second user may not be a participant in the meeting. The analysis module 203 determines whether the second user is a participant based on the name of the second user. Being a non-participant may affect at what time to display the second user at a prominent location of a user interface. If the second user is a participant, the analysis module 203 determines a first or current location of the second user shown on the user interface, which will be used as a reference to determine the prominent location for promoting the second user, i.e., a second location associated with an assigned ranking value representing a higher ranking than that represented by the assigned ranking value of the first location.

In some implementations, the analysis module 203 identifies a set of parameters for determining whether a global display or a local display should be implemented. Although the first user mentions the second user in the meeting, the second user may be promoted for display not only on a user interface associated with the first user (i.e., a local display), but also on multiple user interfaces associated with multiple participants (i.e., a global display). For example, if the first user mentions the second user in a chat session including only themselves, the second user may be promoted for only local display since other users may not be aware of the two users' chat and thus may not be interested in the user promotion resulted from the chat. However, if the mentioned second user becomes a participant of the meeting, other meeting participants may also want to be notified and thus the second user is promoted on a global display.

In some implementations, the analysis module 203 determines a frequency of the mention signal in the chat session. For example, the frequency may include the number of times that the name of the second user is included in the chat session and the number of participants that have included the name of the second user in the chat session. The analysis module 203 may also determine timestamp information associated with mention signal(s). For example, the analysis module 203 may identify a timestamp of the first user mentioning/including the name of the second user in the chat session, a timestamp of each of other names being included in the chat session, and the number of the other names being included in the chat session within a certain time period of the first user mentioning the second user. The analysis module 203 stores the frequency parameters in the analysis result.

In some implementations, the analysis module 203 analyzes the context surrounding the mention signal and identifies a positive mention context. The positive mention context may, for example, include a positive reaction related to the mention such as thumbs-up from other participants. In some implementations, the analysis module 203 may determine whether the mention signal was detected in a private chat, in a public chat present to multiple participants, or in a standalone chat. The standalone chat is a chat session outside the virtual space of the online meeting. If the mention signal is a one-to-one message between the first and second users in a standalone chat, the analysis module 203 may also determine the frequency of the second user being mentioned in this standalone chat. The analysis module 203 stores the parameters of the positive mention context and chat types (e.g., private, public, or standalone) in the analysis result.

In some implementations, the analysis module 203 may also determine a user role of the first user and the second user. The user role may include a meeting role, a job role, etc. Mentioning a user with a specific role or being mentioned by such a user could be more prominent and thus affect the display layout. For example, if a professor mentions a student in a class meeting, this student may need to be known for all classmates on a global display. But if this student is mentioned by another student, the user promotion may only occur between themselves in a local display. In some implementations, the analysis module 203 may further determine whether the second user's reaction to the mention signal is positive or whether the reaction is an emoji. The analysis module 203 stores the parameters of the user role and user reaction in the analysis result.

It should be noted that the analysis module 203 may collect other information and determine other parameters that are helpful to determine where and when to display a promoted user. The analysis module 203 stores the collected information in the analysis result. In some implementations, the analysis module 203 may integrate other signals in analyzing the mention signal, such as an amount of time the first user gazing at the second user, an amount of discussion time between the two users, whether the two users discussed similar topics in a previous meeting, an amount of discussion time related to the similar topics in the previous meeting, etc. The analysis module 202 transmits the analysis result to the decision engine 207 and the action engine 209 for further processing.

Promoting a user includes moving a representation of the user for display to a prominent location on a user interface of a client device 103 associated with a participant. The format module 205 determines the representation for the promoted user, which may be a name, a thumbnail image, or other symbols that are made more distinguishable for the promoted user than other users. In some implementations, the format module 205 determines the representation of the promoted user based on a text style of the chat message or mention signal. For example, the format module 205 may determine a larger representation for the second user if the first user uses a larger font size when mentioning the second user. In addition to the font size, the text style may also include elements such as whether to use bold text, attach a file, add an emoji, or add a gift in the mention signal. These text style elements indicate how prominent a promoted user is, and thus may impact the appearance of the representation of the promoted user. For example, if the mention signal @name of the second user includes an emoji, the format module 205 may modify a current representation of the second user for a promoted display based on the emoji. Also, other than adjusting the size of the representation, the format module 205 may change a color of the representation, add a visual indicator to the representation, frame the representation, etc., to distinguish a promoted user.

In other implementations, the format module 205 also modifies the representation of the promoted user based on a global display determination or a local display determination received from the decision engine 207. For example, if the first user uses large and bold font mentioning the second user in a private chat, the format module 205 may enlarge the representation of the second user for display only on the user interface of the first user. However, if the mention signal is also present to other participants and the second user will be promoted to display on user interfaces of the other participants, the format module 205 may not change the size of the representation to particularly emphasize the second user since the second user may not be particularly prominent to the other participants.

In some other implementations, the format module 205 further modifies the representation of the promoted user based on a quote style. Therefore, if the second user is quoted in a chat session that attracts more participants for more active discussion, the format module 205 may modify the representation of the second user to make the second user more prominent. Once the representation is determined or modified, in some implementations, the format module 205 communicates with other modules/engines 207-211 to instruct one or more client devices to display the representation of the promoted user on one or more user interfaces associated with the one or more client devices.

The decision engine 207 receives the analysis result from the analysis module 203, and determines on which user interface(s), at which location of the user interface(s), and at what time to display a representation of a promoted user based on the analysis result. As described above, responsive to receiving the mention signal that the first user @mentions the second user in the chat session/audio session of an online meeting, the decision engine 207 may determine a prominent location of a user interface at which a representation of the promoted second user should be displayed. If the analysis result from the analysis module 203 shows that there is a current location of the second user on the user interface of the first user, i.e., the second user has been displayed at a first location on the user interface of the first user before the detection of the mention signal, the prominent location may be a second location associated with an assigned ranking value representing a higher ranking than that represented by the assigned ranking value of the first location. Otherwise, the prominent location may be a location with an assigned ranking value that exceeds a threshold ranking value.

A user interface displayed on a client device 103 accessed by a meeting participant may include multiple display locations. In some implementations, each display location on the user interface is assigned with a unique ranking value representing a ranking of the display location among the multiple display locations. For example, the ranking values corresponding to locations on multiple rows of a user interface may decrease from the top row to the bottom row, and from the leftmost location to the rightmost location within each row. Therefore, promoting the second user or promoting the display location of the second user may include moving the representation of the second user to the top and/or left location of the user's current location. When the second user is not currently displayed on the first user's interface, the decision engine 207 may determine that ranking values of locations on the first row exceed a pre-defined threshold ranking value, and identify at a location of the first row for display the representation of the second user.

In other implementations, a user interface may be divided into different hierarchies, for example, a primary area and a secondary area for displaying user representations. The secondary area includes an overflow zone. The locations of a same class, i.e., in the same area/zone, may share a same ranking value. In some implementations, the ranking values are assigned to locations in the primary area, the non-overflow zone of the secondary area, and the overflow zone in descending order. Since the user representations located in the primary area and in the non-overflow zone of the secondary area are visible, and the participants inside the overflow zone are not visible unless being made visible by a manual operation, the ranking values also reflect visibility of a location.

In some implementations, if the second user is currently located in the overflow zone, the decision engine 207 may determine a location outside the overflow zone as a prominent location for promoting the second user. If the second user is currently located outside the overflow zone but inside the secondary area, the decision engine 207 may determine a location in the primary area as the prominent location. However, if the second user is already located in the primary area, the decision engine 207 may not be able to promote the current location to a location with a ranking value that is higher than that of the current location. Instead, the decision engine 207 may promote the first user to a location in the primary area (if the first user is not already in the primary area), or communicate with the format module 205 to make the representation of the second user more distinguished by changing the size, color, shape, frame, etc. By @mentioning a user and promoting the user, the decision engine 207 along with other components of the user promotion application 105 generally makes the promoted user visible and distinguishable (e.g., by taking the user out of the overflow zone), and facilitates the communication between the users.

It should be noted that the present application discloses a technical solution for providing an improved user interface for a client device. The technical solution described herein discloses a particular manner of identifying and promoting a user for presentation in electronic client devices. Currently, representations or icons of meeting participants are mostly organized and displayed in a static layout. For example, pre-selected participants such as a presenter and an organizer may be displayed during the entire time of an online meeting. A static layout of the presentation cannot reflect the meeting progress. Even if a user was mentioned many times by many people in a chat session of the meeting and should be a focus of the meeting, this frequently mentioned user may never be made prominent and visible to other meeting participants on their displays due to the static layout and limited display space. Therefore, with current approaches, if a non-typical arrangement of presenting a participant (e.g., the frequently mentioned user) is needed, a viewer would need to manually manipulate the representation of the participant on his/her display. The technical solution described in the present application addresses this technical problem by providing a system and method for automatically rearranging icons or representations on a graphical user interface, that is, moving a representation/icon of a promoted user to a prominent location on the user interface. The prominent location is either a location that is associated with an assigned ranking value representing a higher ranking than that represented by the assigned ranking value of the current location on the user interface, or a location with an assigned ranking value that exceeds a threshold ranking value.

The technical solution particularly improves user interfaces for electronic devices with small screens. The current user interfaces require users to drill down through layers of a small screen to get to desired data or functionality. For example, to reveal information of a user, a viewer may need to find an overflow zone, operate on the zone to open up a user list, and scroll down the user list of a large number of participants to find the right user. This is slow and may be difficult for novice users to find the functionality. The technical solution described herein achieves some technical benefits. By showing the representation of a promoted user in an area that is viewable and accessible directly from the user interface, the speed of a viewer's navigation is improved. Rather than the viewer paging through multiple icons or screens via various views of user interfaces on a small screen, the required data are directly visible to the viewer. Also, displaying the promoted or focused user in a prominent location allows a viewer to obtain the most relevant data or functions. This relieves the viewer from operations of searching for the hidden important information (e.g., in the overflow zone), and thus the efficiency of using the electronic client device is improved. Therefore, the technical benefits indicate an improvement in the functioning of computers, particularly those with small screens.

In addition to identifying a prominent location, the decision engine 201 also determines on which user interface(s) for display a promoted user. In some implementations, the decision engine 207 may determine whether to promote a user for a global display or a local display, and identify one or more user interfaces associated with one or more client devices 103 for display the promoted user based on the determination of a local display or a global display. A local display includes displaying the promoted user only on a single user interface associated with a single client device of one meeting participant. A global display includes displaying the promoted user on N user interfaces associated with N client devices of N participants, where N is a positive integer greater than one. N participants may represent all meeting participants.

Figure 3:
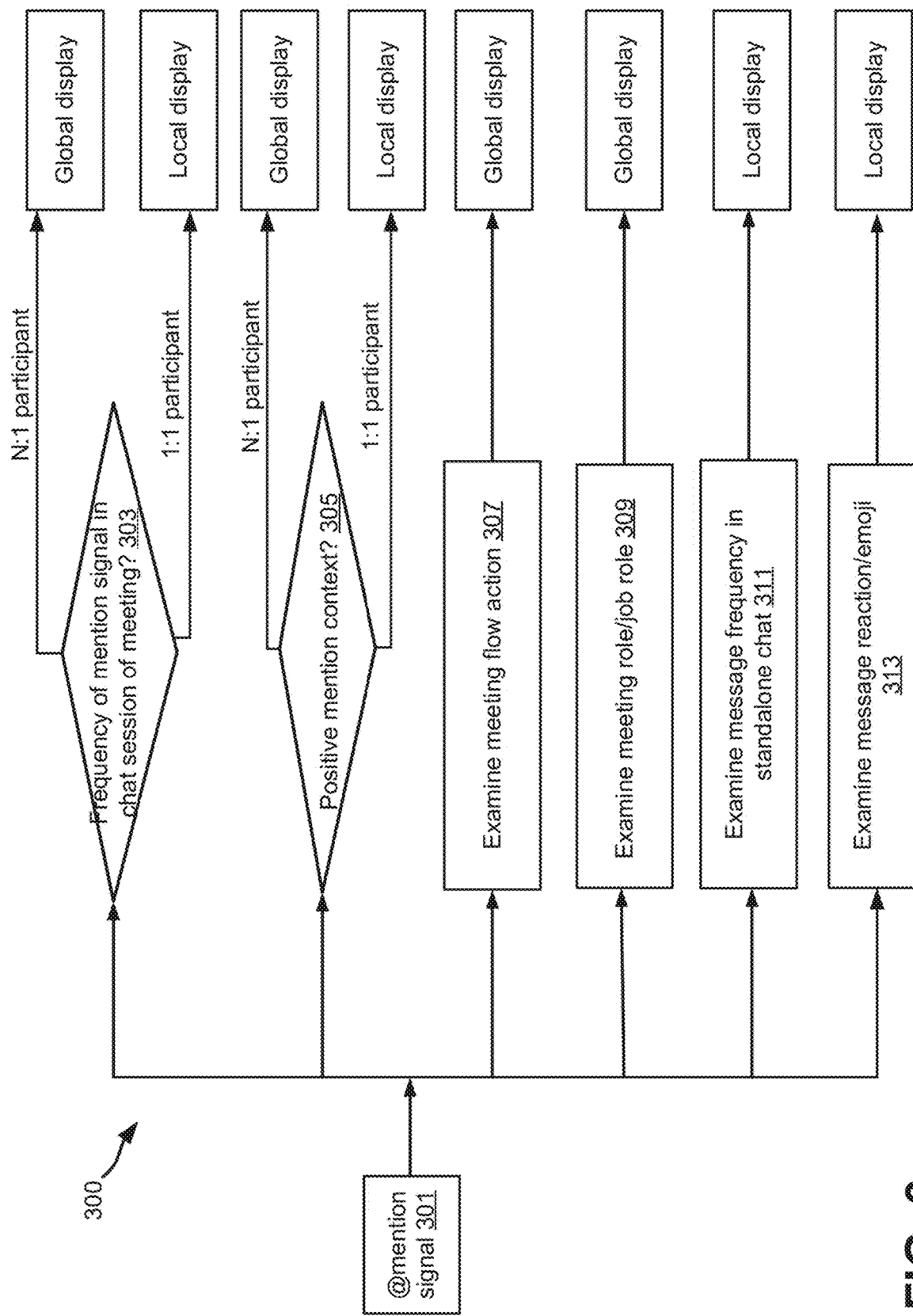
FIG. 3 is a block diagram of an example procedure for determining whether to display a promoted user globally or locally.

FIG. 3 shows an example procedure for determining a global display or a local display. As depicted, responsive to receiving a mention signal that the first user @mentions the second user at block 301, the decision engine 207 examines different parameters at blocks 303-313 to determine a global display or a local display for the promoted second user. The different parameters are included in the analysis result received from the analysis module 203. The different parameters may be divided into three groups. The decision engine 207 uses each group of parameters to choose between a global or local display, to identify a global display, or to identify a local display, respectively.

At blocks 303 and 305, the decision engine 207 uses the first group of parameters to determine whether to display globally or locally. At block 303, the decision engine 207 examines the frequency of the mention signal in a chat session of the meeting to determine on which user interface(s) the promoted second user should be displayed. In one specific example, if the first user mentioned the second user once within a certain time window (e.g., 1:1 participant scenario), the decision engine 207 determines to display the promoted second user locally on the user interface associated with the first user. For example, displaying the promoted second user locally may include moving a representation of the second user from a first location to a second location for display on the user interface associated with the first user. The first location is a location at which the representation of the second user has been displayed before the detection of the mention signal, and the second location is a location associated with an assigned ranking value that represents a higher ranking than that represented by the assigned ranking value of the first location. In contrast, the name of the second user may also be mentioned N times during the certain time window, where N is a positive integer greater than one. If only a single participant, i.e., the first user, has mentioned the second user N times, the decision engine 207 may still determine to display the second user locally on the user interface of the first user but at a more prominent location with a more distinguished representation to indicate that the second user is more important to the first user. Continuing with the above example, the more prominent location may be a third location that has a ranking value higher than that of the second location. The more distinguished representation may be the representation with modified size, color, etc. However, if N participants have mentioned the name of the second user (e.g., N:1 participant scenario), the decision engine 207 may determine that the second user is highly relevant or important, and thus promote the second user for global display on N user interfaces associated with the N participants.

At block 305, the decision engine 207 examines a positive mention context to determine on which user interface(s) the promoted second user should be displayed. For example, the positive mention context that only occurs between the first user and the second user (i.e., 1:1 participant scenario) may lead the decision engine 207 to display the promoted second user locally. Alternatively, if multiple participants positively comment on a mention to make the second user highly relevant to the multiple participants (e.g., N:1 participant scenario), the decision engine 207 may determine a global display of the promoted second user on the user interfaces associated with the multiple participants.

At blocks 307 and 309, the decision engine 207 uses the second group of parameters to identify a global display. At block 307, the decision engine 207 may examine a meeting flow action to determine a global display. The meeting flow action is an action that is critical to direct or affect the data flow in the meeting. For example, if the first user @mentions the second user that "your video seems to be frozen," this may trigger the decision engine 207 to promote the second user for display to all participants to remind them that the video from the second user will be or has been removed. In another example, if the first user mentions the second user in a public chat session, i.e., the mention is present to multiple participants, the decision engine 207 may determine a global display for the second user.

At block 309, the decision engine 207 may examine a user role to determine a global display. The user role may be a meeting role, a job role, etc. The user role may be of the first user and/or the second user. For example, if a content presenter mentions a user, the decision engine 207 may make this user prominent/focus to every meeting participant because of the important meeting role of the content presenter. Similarly, if a user mentions a person with a high job level (e.g., boss), the decision engine 207 may also promote this person to be visible for every meeting participant.

At blocks 311 and 313, however, the decision engine 207 may use the third group of parameters to identify a local display. At block 311, the decision engine 207 examines the message frequency in a standalone chat to determine a local display. In some implementations, if the first user mentions the second user in a standalone chat outside the meeting using a chat service, and the frequency of mentions exceeds a predetermined threshold, the decision engine 207 may promote the second user for a local display. In some cases, when the first user addresses the second user in a private chat session associated with the meeting to bring the second user's awareness without interrupting the meeting, the decision engine 207 may also determine a local display for the second user.

At block 313, the decision engine 207 examines a message reaction to determine a local display. For example, if the second user provides a negative reaction (e.g., "I don't want to be watched!"), the decision engine 207 may trigger a local display. Moreover, when the second user chooses to opt out of the promotion using an opt-out option, the decision engine 207 may determine a local display for the second user, or not to promote the second user at all. In some implementations, the second user may react with an emoji, and the emoji signals the decision engine 207 to determine a local display for the second user.

Referring back to FIG. 2, the decision engine 207 further weighs and ranks mention signals based on one or more of mention frequency, positive mention context, meeting flow action, message frequency in standalone chat, meeting/job role, message reaction, etc., to determine a prominent location of one or more user interfaces for display a promoted user. For example, if two users are mentioned in a chat session with different frequencies, the decision engine 207 may determine a location associated with a higher ranking value representing a higher ranking on a user interface to display the representation of the user that was mentioned with a higher frequency. Now suppose M users are mentioned and only K users can be shown visibly in a user interface due to display space limitations, where K and M are integers, K<M. The decision engine 207 may weigh the M users based on the factors such as the number of times each user being mentioned, the positive mention context related to each mentioned user to identify the K visible promoted users. Moreover, if one of the M-K users that was not promoted to a visible location continues to be mentioned, the decision engine 207 may re-rank the mention signals and promote this specific user to a visible location.

In addition to updating the location at which the promoted user is displayed on a user interface, the decision engine 207 may also determine whether to convert between a global display and a local display. For example, if the first user @mentions the second user "can you start searching for the presentation?" this one-time mention signal may indicate a local display. But if the decision engine 207 receives positive reactions (e.g., thumb-up, follow, endorse) to this mention signal from other participant(s) or determines that the "presentation" word means that the second user will upload a document for presentation based on the context, the decision engine 207 may then determine to bring the second user to a prominent location of user interfaces for a global display to every participant. On the other hand, if a global display has been determined based on the first user mentioning the second user, but the second user does not notice that he/she has been mentioned and provides no reaction to the mention (e.g., within a specified time window), the decision engine 207 may convert the global display of the second user into a local display to reduce the unnecessary user promotion on multiple user interfaces, thereby saving the cost of computing resources and bandwidth.

Once specific user interface(s) and specific location are identified, the decision engine 207 usually notifies the action engine 209 and the user interface module 211 to display the representation of the promoted second user. However, in some scenarios, the decision engine 207 also determines a time condition for the display of the promoted second user. When the promoted second user is not yet in the meeting, the decision engine 207 notifies the action engine 209 and the user interface module 211 to delay the display until the second user joins the meeting. The decision engine 207 may also determine to display the promoted second user after the second user has uploaded or shared a file. In some implementations, the decision engine 207 provides an opt-out option for the second user to opt out of the promotion if he/she does not approve the promotion. The decision engine 207 communicates with the user interface module 211 to notify the second user that he/she is going to be promoted for display on specific user interface(s) and provide the second user an opt-out option. If the second user sends a confirmation of the opt-out option, the decision engine 207 notifies the action engine 209 to maintain the display of the specific user interface(s) without promoting the second user. If the second user sends a rejection of the opt-out option, the decision engine 207 notifies the action engine 209 to move the representation of the second user for display.

The action engine 209 performs the action of moving the representation of the promoted user to a prominent location of specific user interface(s). The prominent location is either a location that is associated with an assigned ranking value representing a higher ranking than that represented by the assigned ranking value of the current location on the user interface, or a location with an assigned ranking value that exceeds a threshold ranking value.

The action engine 209 receives information about representation, location, and user interface(s) from the format module 205 and the decision engine 207, and instructs the user interface engine 213 to generate a display for the promoted second users. In some implementations, the action engine 209 monitors whether a non-participant second user has joined the online meeting. Once the second user has joined the meeting, the action engine 209 communicates with the user interface module 211 to promote and display the representation of the second user at a prominent location. The action engine 209 may also monitor whether the second user has uploaded a file and move the representation of the second user for display subsequent to the upload of the file. In other implementations, responsive to the decision engine 207 providing an opt-out option for the second user to choose whether to be promoted, the action engine 209 instructs the user interface module 211 to wait and receive a selection to the opt-out option from the second user, and to display the representation of the second user at the prominent location when a rejection is received.

The user interface module 211 receives instruction(s) from the action engine 209 and/or the decision engine 207 to send graphical data to the client device 103, causing the client device 103 to present a user interface to a user. Example user interfaces are shown in FIGS. 6 and 7A-7G. In some implementations, the user interface module 211 generates the graphical data for providing a user interface that presents a representation of a promoted user to a viewing participant. For example, a decision engine 207 of the online-meeting management server 101 may determine a user interface associated with the client device 103*a* and a location on the user interface for display a representation of a promoted user, and instructs the action engine 209 and the user interface module 211 of the client device 103*a* to generate the graphical data to present the representation of the promoted user at a determined location of the user interface. In some implementations, the user interface module 211 generates a user interface that allows a promoted user to provide a confirmation or a rejection to an opt-out option. The user interface module 211 may generate graphical data for providing other user interfaces to users.

Figure 4:
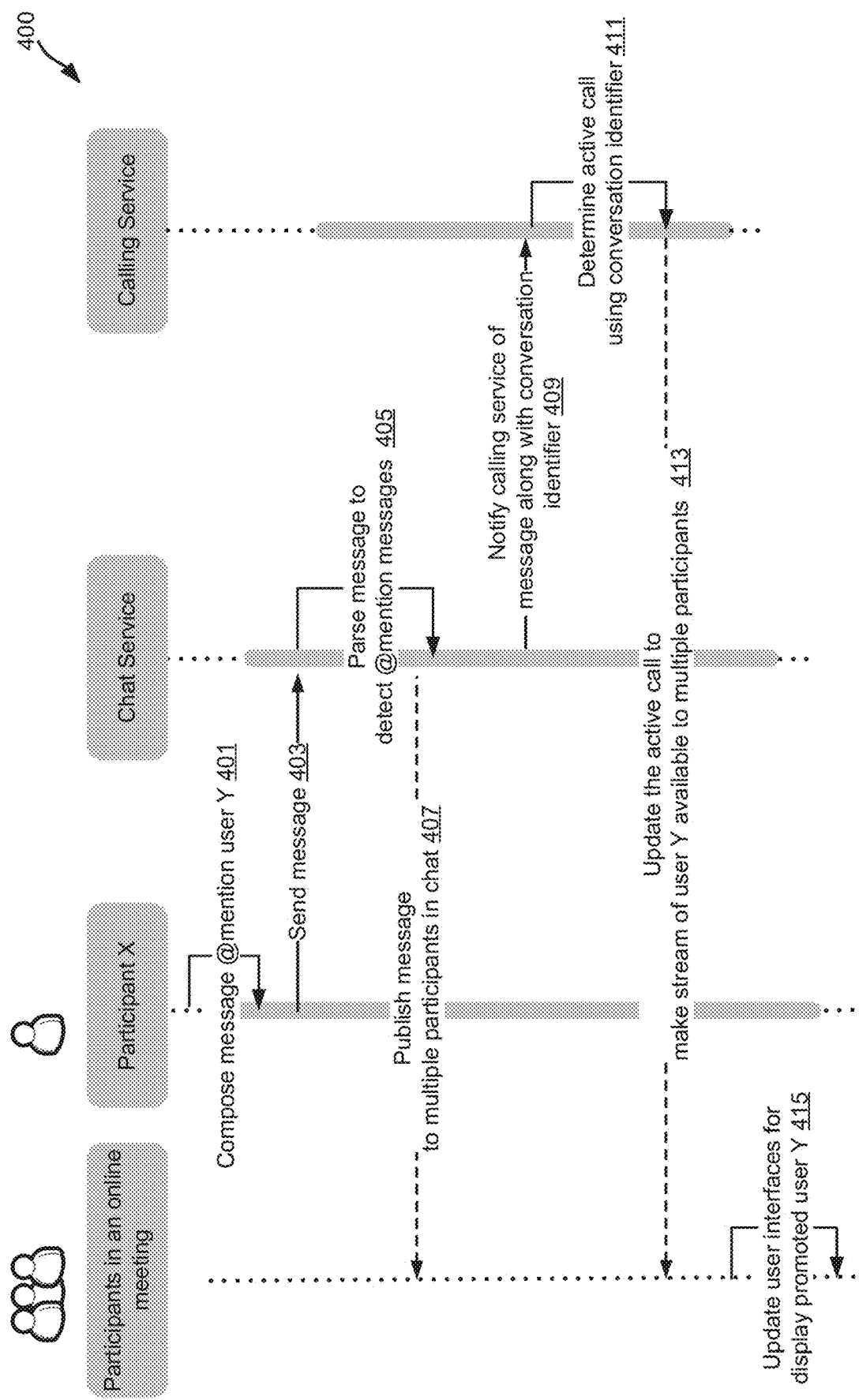
FIG. 4 is a block diagram of an overall user promotion procedure implemented based on backend services.

FIG. 4 is a block diagram of an overall user promotion procedure 400 implemented based on backend services. One of the participants of an online meeting, participant X, composes a message @mention user Y at 401, and sends this message to the backend chat service at 403. User Y may or may not be a participant of the meeting. In some implementations, the online-meeting management server 101 hosts the online meeting and supports the chat service, calling service, and other services. At 405, the chat service receives the messages in a chat session, parses the received messages, and detects the @mention message sent from participant X. In some implementations, at 407, the chat service also publishes the message to multiple participants in the chat session. This dashed-lined step is optional because the chat session may be a one-to-one chat without other participants (i.e., a private chat).

Responsive to detecting the @mention message or the mention signal, at 409, the chat service notifies the calling service of the @mention message along with a conversation identifier. The conversion identifier uniquely identifies the online meeting. In some implementations, the chat service also transmits the information of the mentioned or tagged user (i.e., user Y) and mentioning/tagging user (i.e., participant X) to the calling service. The calling service may then determine an active call based on the conversation identifier received from the chat service at 411, and update the active call to make the data stream of user Y available to multiple or all participants at 413. Based on the update of the active call, the user interfaces associated with the multiple or all participants are also updated to display the mentioned/promoted user Y at 415. In some implementations, a first location on each user interface associated with multiple participants is identified. The first location is associated with a first assigned ranking value, at which a representation of user Y is currently displayed. Based on the update of the active call, multiple client devices 103 associated with multiple participants are instructed to promote a display location of user Y by moving a representation of user Y from the first location for display to a second location on the user interface, wherein the second location on the user interface is associated with a second assigned ranking value representing a higher ranking than that represented by the first assigned ranking value of the first location on the user interface.

Figure 5:
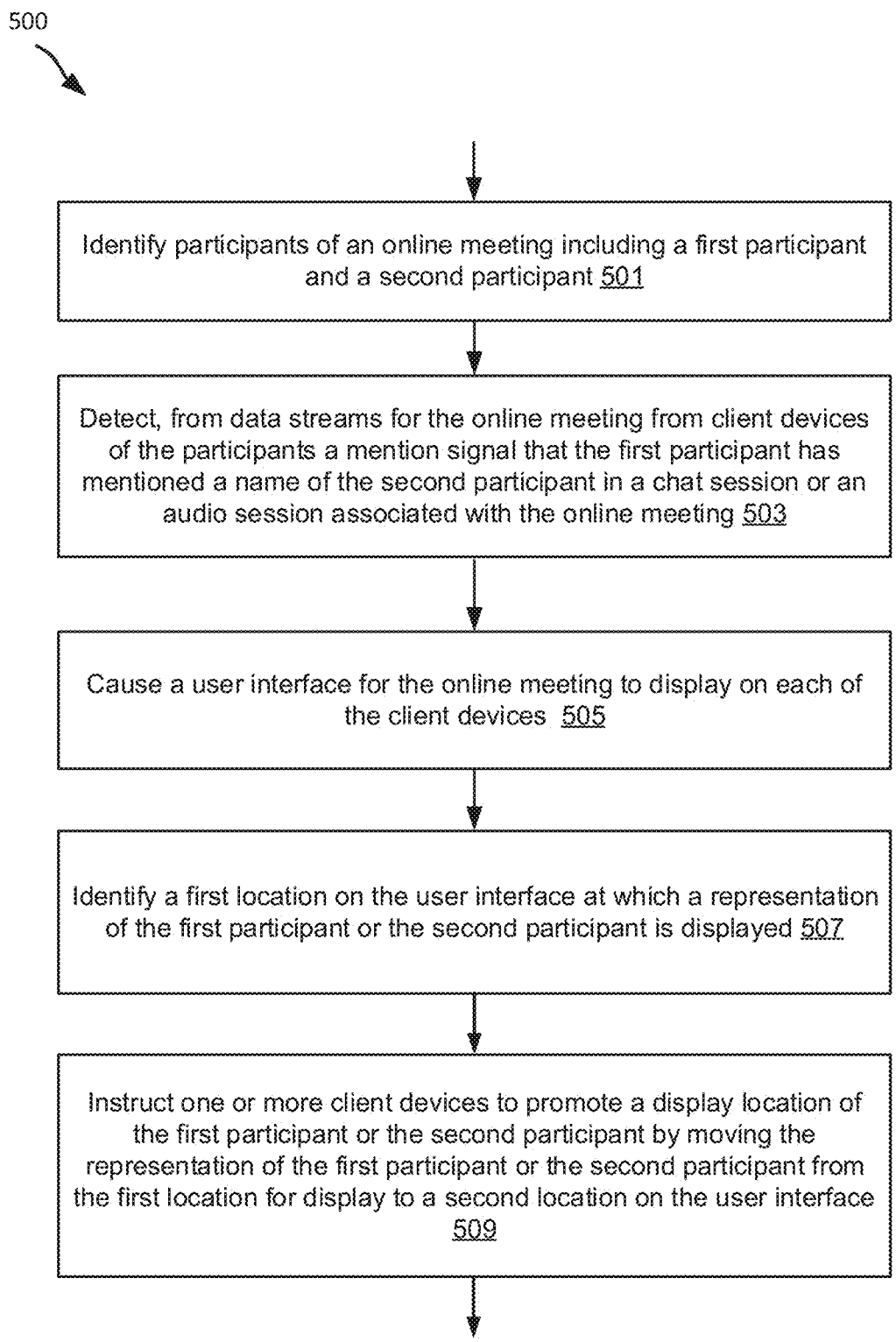
FIG. 5 is a flowchart of an example method for identifying and promoting a user based on a mention signal.

FIG. 5 is a flowchart of an example method 500 for identifying and promoting a user based on a mention signal performed by a user promotion application 105 of the online-meeting management server 101. In some implementations, the user promotion application 105 residing on the online-meeting management server 101 may perform steps 501-509 in this figure to identify a user and determine a representation, a location, user interface(s) for promoting the display of the user, and to instruct the client devices 103 to display the representation at the determined location on the determined user interface(s).

At block 501, the user promotion application 105 identifies participants of an online meeting including a first participant and a second participant. At block 503, the user promotion application 105 detects, from data streams for the online meeting from client devices of the participants, a mention signal. The data streams may include text, audio, video, image data exchanged among the participants of the online meeting. In one specific example, the mention signal may be a signal that the first participant has "@name" mentioned the second participant in the chat session associated with the online meeting. In another specific example, the mention signal may be a signal that the first participant has "@name" mentioned the second participant in the audio session associated with the online meeting.

In either case, at block 505, the user promotion application 105 causes a user interface for the online meeting to display on each of the client devices 103. The user interface may include display locations for representing one or more participants of the online meeting. Each display location may be associated with an assigned ranking value representing a ranking of the display location among the display locations. At block 507, the user promotion application 105 identifies, from the displayed locations, a first location on the user interface. A representation of the first participant or the second participant is currently displayed at the first location. The first location is associated with a first assigned ranking value. At block 509, responsive to detecting the mention signal, the user promotion application 105 instructs one or more client devices to promote a display location of the first participant or the second participant on the user interface. The user promotion application 105 moves the representation of the first participant or the second participant from the first location for display to a second location on the user interface. The second location on the user interface is associated with a second assigned ranking value representing a higher ranking than that represented by the first assigned ranking value of the first location on the user interface.

In some implementations, the first location and the second location each have a unique ranking. In other implementations, the display locations are included in multiple display areas of the user interface. The display locations inside the same display area share the same ranking value. The first and second locations are located in different display areas. For example, a user interface may include a primary area and a secondary area, and the secondary area may include an overflow zone. The ranking values may be assigned to locations in the primary area, the non-overflow zone of the secondary area, and the overflow zone in descending order. In such scenario, the first location could be a location inside the overflow zone. The second location could be a location in the non-overflow zone of the secondary area or in the primary area. By moving the second participant out of the overflow zone to the second location for presentation, a viewer (e.g., the first participant) no longer needs to drill down the overflow zone to view the representation of the second participant. The change from information view through intermediate steps to direct information view and access significantly reduces the consumption of computer resources, and therefore improves the computer functioning.

In some implementations, the user promotion application 105 may also move the first user from the first location to the second location of the user interface associated with the second participant to remind the second participant to interact with the first user, which therefore improves user communication. Also, if the mention signal is present to multiple participants of the chat or audio session, the user promotion application 105 may promote the second participant for display on the user interfaces of multiple participants.

Figure 6:
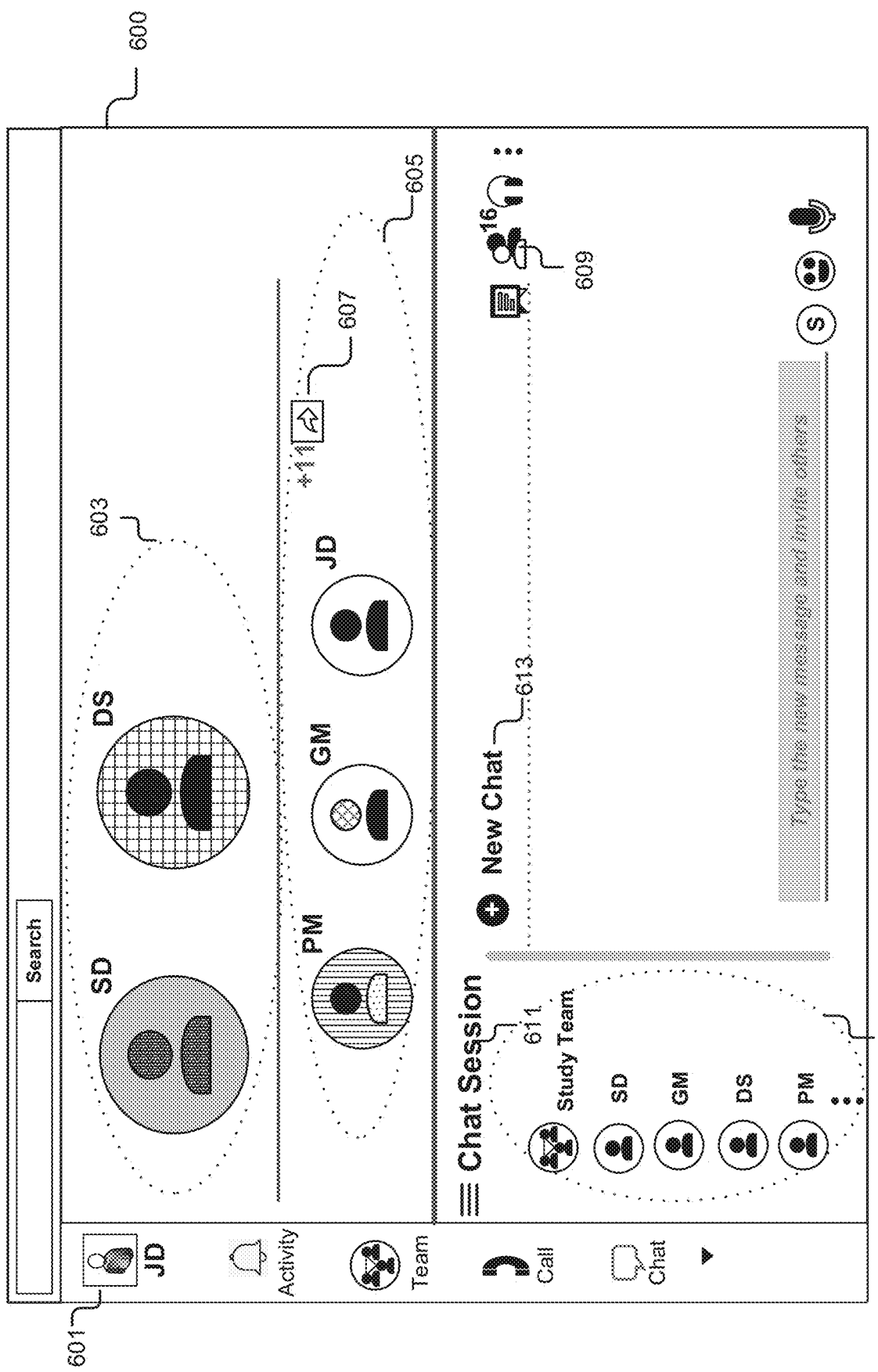
FIG. 6 is an example graphical user interface before promoting a user for display based on a mention signal.

FIG. 6 illustrates an example graphical user interface 600 before promoting a user for display based on a mention signal. The user interface 600 shows an initial display layout for a participant (i.e., user JD at 601) when an online meeting starts. As depicted, the user interface 600 includes a primary area 603 and a secondary area 605 for displaying representations of participants. The secondary area 605 includes an overflow zone 607. The participants shown in the primary area 603 and in the non-overflow zone of the secondary area 605 are visible. The participants shown inside the overflow zone 607 are not visible and will become visible when the arrow of the overflow zone 607 is selected to expand the overflow zone 607. In the depicted example, 11 participants are shown inside the overflow zone 607 while the total number of the participants of the online meeting is 16 as shown in 609. The ranking values are assigned to locations in the primary area 603, non-overflow zone of the secondary area 605, and the overflow zone 607 in descending order.

The user interface 600 further includes a chat session area 611 for participants to chat with each other. In particular, a participant may initiate a public chat with one or more participants through the new chat option 613, and may initiate a private chat with a specific participant through one of the names listed in 615. Once a mention signal is detected from chat message(s) in the chat session area 611, a user may be promoted, which causes the user interface 600 to be updated to one of the user interfaces shown in FIGS. 7A-7H.

Figure 7A:
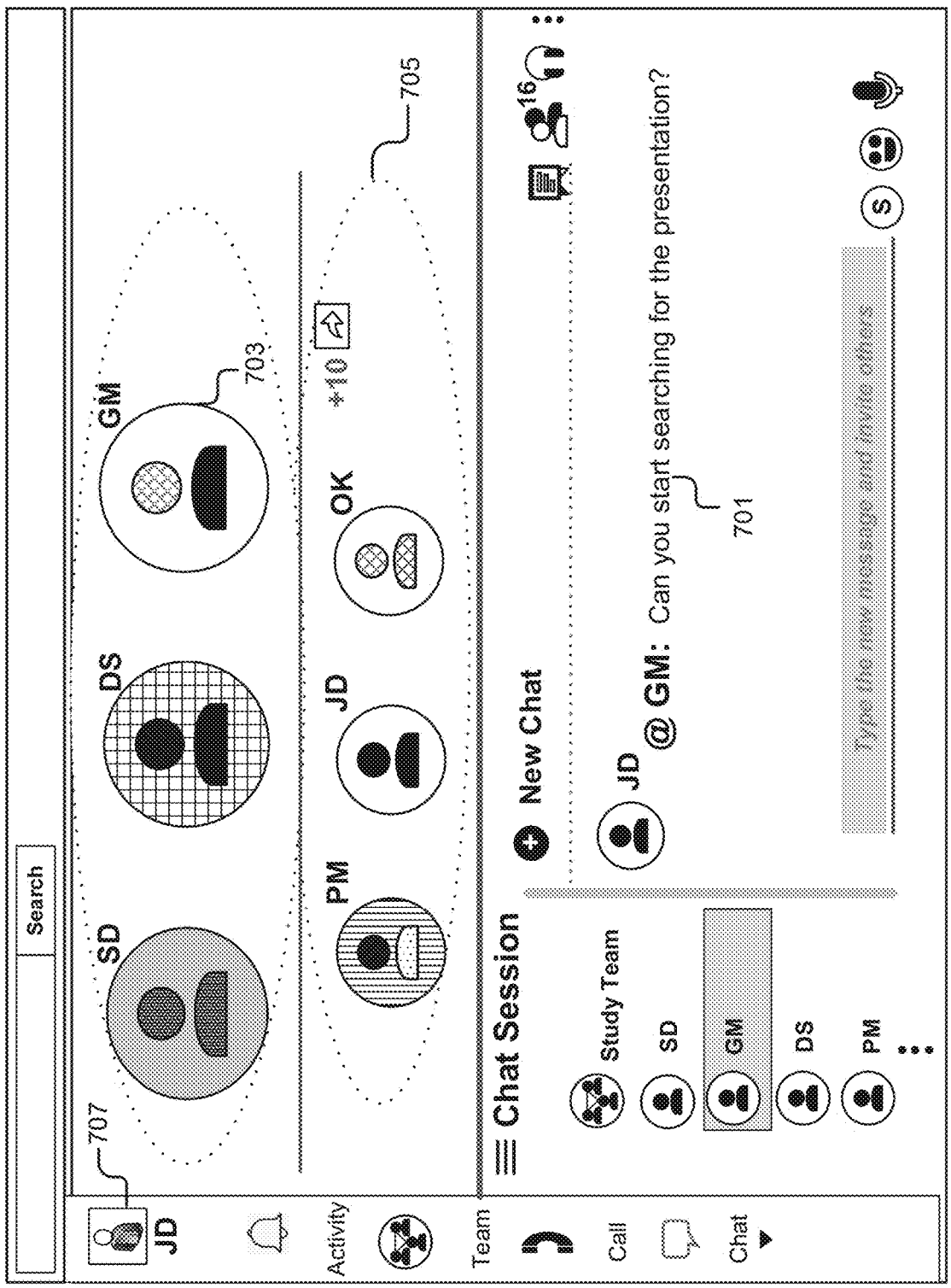
FIG. 7A is an example graphical user interface for showing a local display of a promoted user.

FIG. 7A is an example graphical user interface showing a local display of a promoted user. In this example, at 701, JD @mentions GM "Can you start searching for the presentation?" This may be a one-to-one message or mention signal that JD addressed GM in a private chat, so the decision engine 207 determines a local display for promoting GM only on the user interface of JD (as shown in 707). Responsive to the mention signal, the user interface module 211 moves the representation of GM from a location in the secondary area as shown in the user interface of JD of FIG. 6 to the prominent location 703 in the primary area of FIG. 7A, and also updates the secondary area 705 accordingly.

Figure 7B:
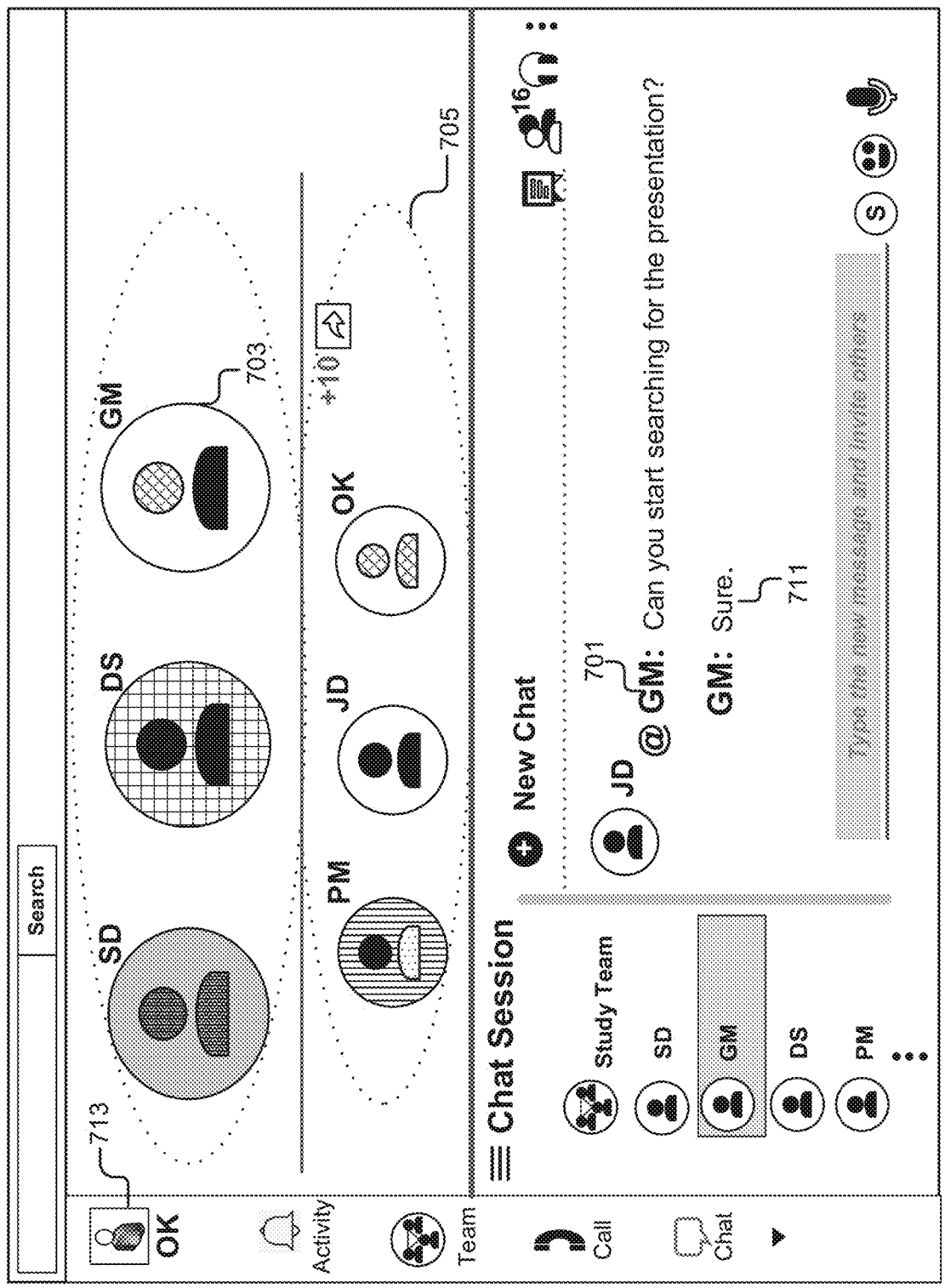
FIG. 7B is an example graphical user interface for showing a global display of a promoted user.

FIG. 7B is an example graphical user interface showing a global display of a promoted user. In this example, GM replies "sure" 711 to the mention signal 701 as shown in FIG. 7A. The decision engine 207 may take this reply as a meeting flow action because it signals that GM will take over the presentation and the meeting flow will be changed. As a result, the decision engine 207 notifies the action engine 209 and the user interface module 211 to convert the local display in FIG. 7A into a global display, i.e., displaying the promoted user GM at 703 to multiple or all participants including the participant OK 713 in FIG. 7B. Although not shown, FIG. 7B could represent other user interfaces of other participants such as JD, GM, etc.

Figure 7C:
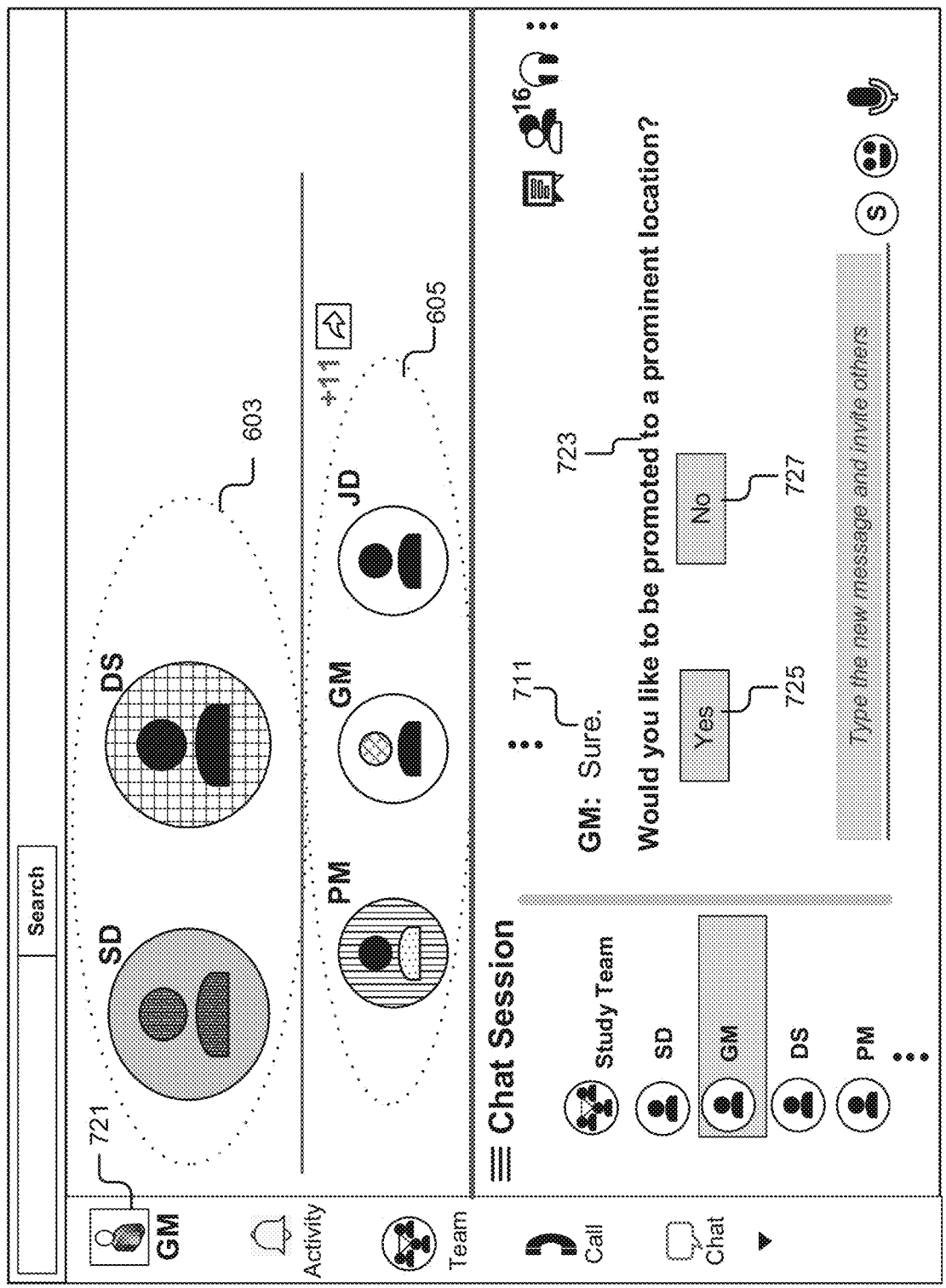
FIG. 7C is an example graphical user interface for providing an opt-out option for a promoted user.

FIG. 7C is an example graphical user interface for providing an opt-out option for a promoted user. Continuing with the example in FIG. 7B, GM replies "sure" 711. But this reply may not mean that GM wants to be promoted to become a focus of other participant(s). Therefore, on the user interface of GM 721 in FIG. 7C, the decision engine 207 provides an opt-out option 723 for GM to choose whether to be promoted via clickable buttons 725 and 727. Without a user confirmation of the promotion, the initial display of the primary area 603 and the secondary area 605 as shown in FIG. 6 will be maintained unchanged on the user interface of GM 721.

Figure 7D:
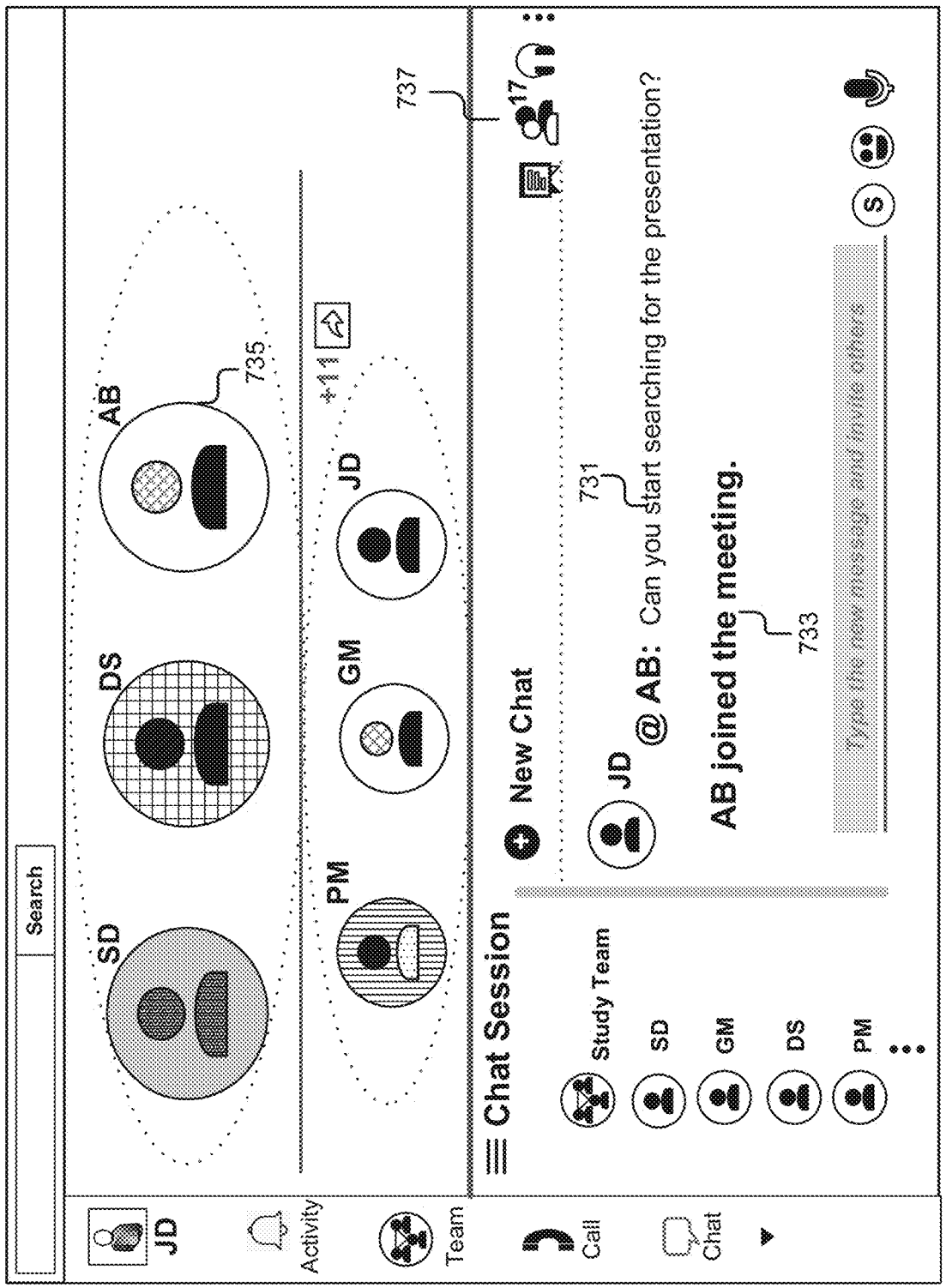
FIG. 7D is an example graphical user interface for promoting a non-participant user.

FIG. 7D is an example graphical user interface for promoting a non-participant user. In this example, at 731, JD @mentions AB. This mention signal may lead user AB to be promoted, but user AB is not in the meeting yet. Only after receiving the signal 733 that user AB joined the meeting, the action engine 209 would update the user interface of JD to show the promoted user/participant AB at location 735 of the primary area and to increase the total number of participants to 17 at 737.

Figure 7E:
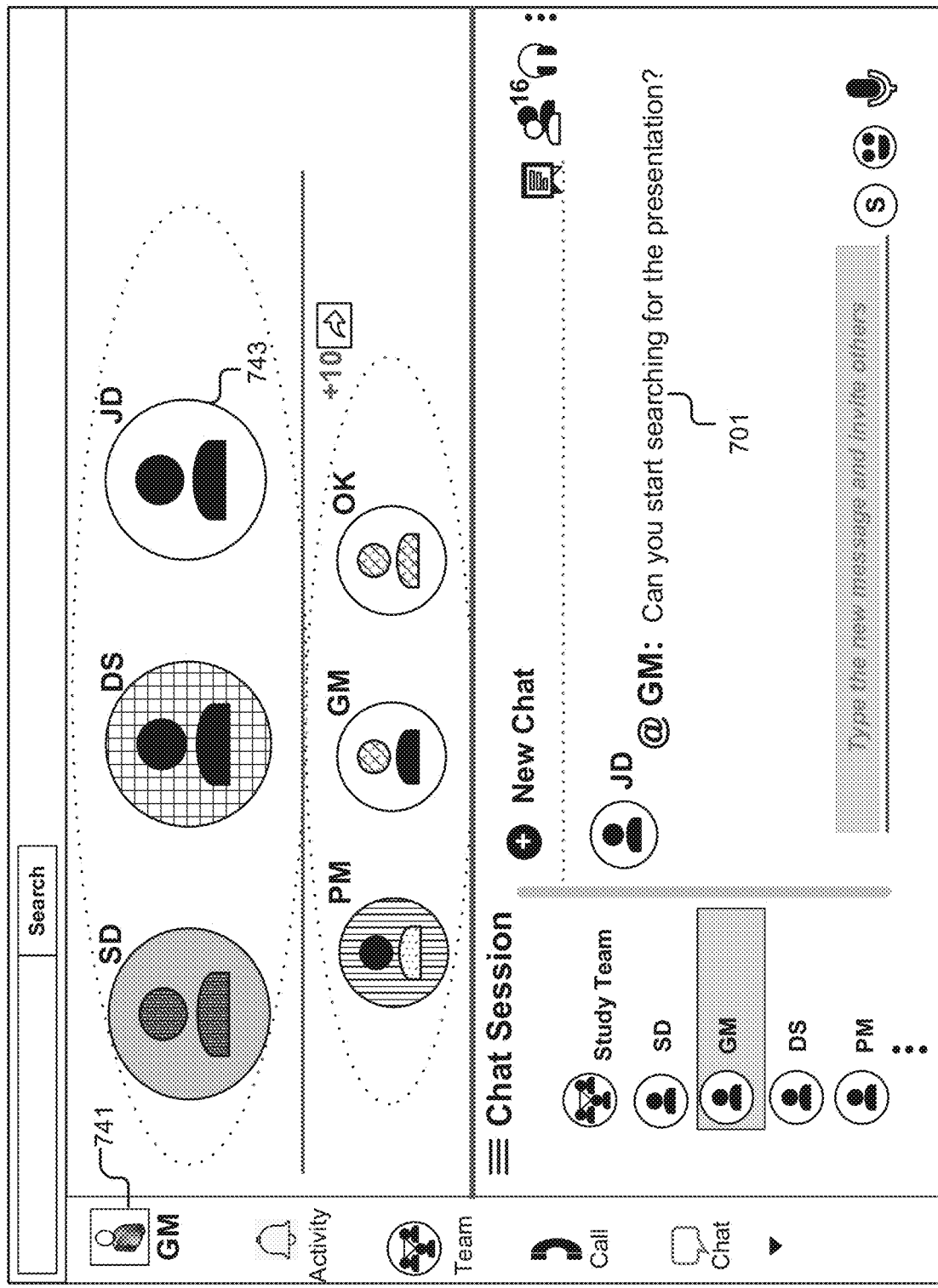
FIG. 7E is an example graphical user interface for promoting a first user for display based on the first user mentioning a second user.

FIG. 7E is an example graphical user interface for promoting a first user for display based on the first user mentioning a second user. Similar to FIG. 7A, the example of FIG. 7E shows that JD sends a mention signal JD @mentions GM at 701. However, different from promoting the mentioned user GM on the user interface of the mentioning user JD in FIG. 7A, this figure shows promoting the mentioning user JD to a prominent location 743 of the primary area on the user interface of the mentioned user GM 741. The two-way promotion as shown in FIG. 7A and FIG. 7E reminds both users to react, thereby improving user communication.

Figure 7F:
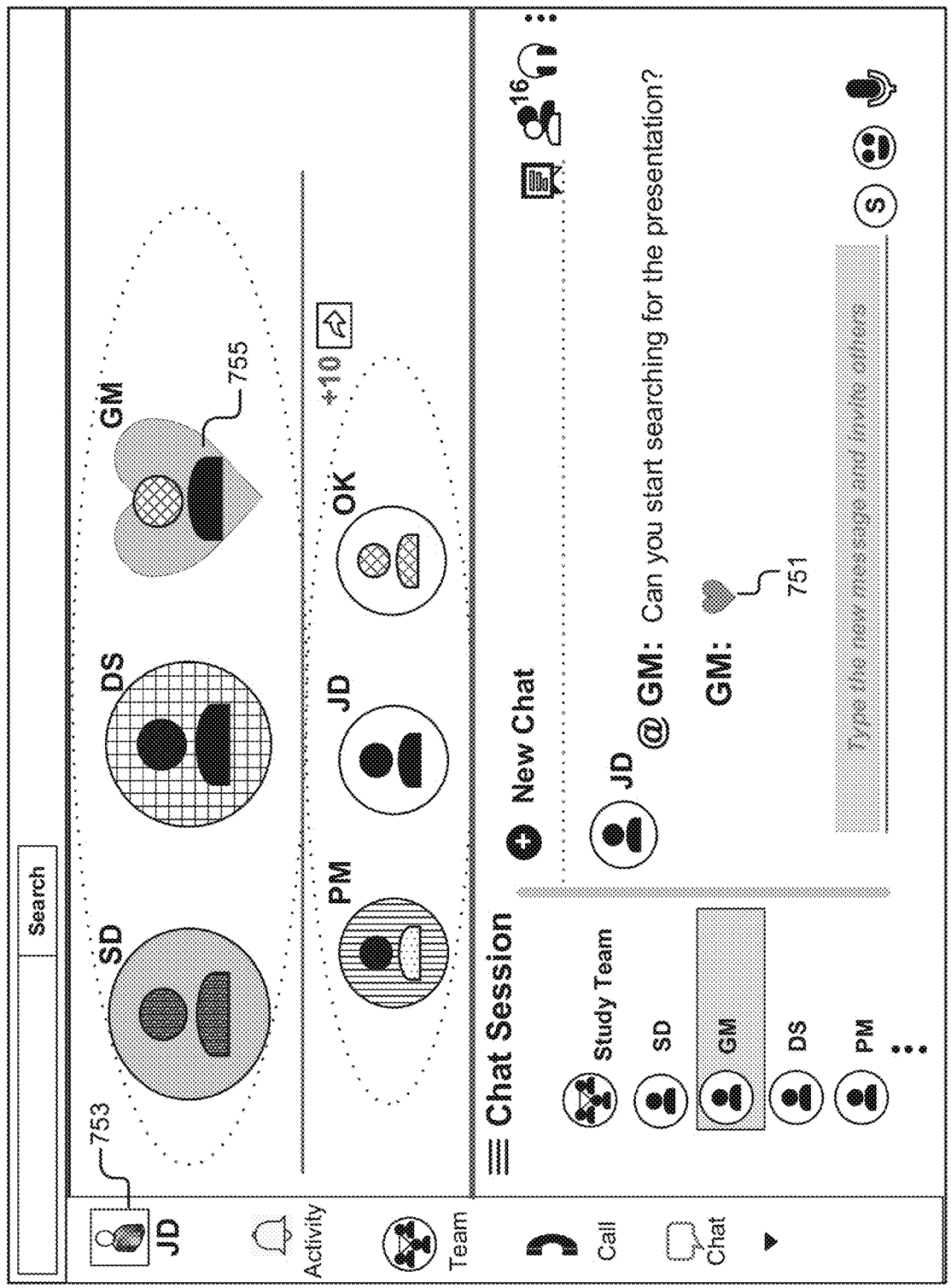
FIG. 7F is an example graphical user interface for displaying a promoted user with a different representation.

FIG. 7F is an example graphical user interface for displaying a promoted user with a different representation. In this example, GM replies with a heart emoji 751 when JD mentions GM. In some implementations, an emoji signals a local display, i.e., only the user interface of JD 753 will be updated with a promoted display of GM. The emoji may also signal modification of the representation of the promoted user. As shown in this figure, the user interface of JD 753 is updated with a heart representation of GM at a prominent location 755 of the primary area.

Figure 7G:
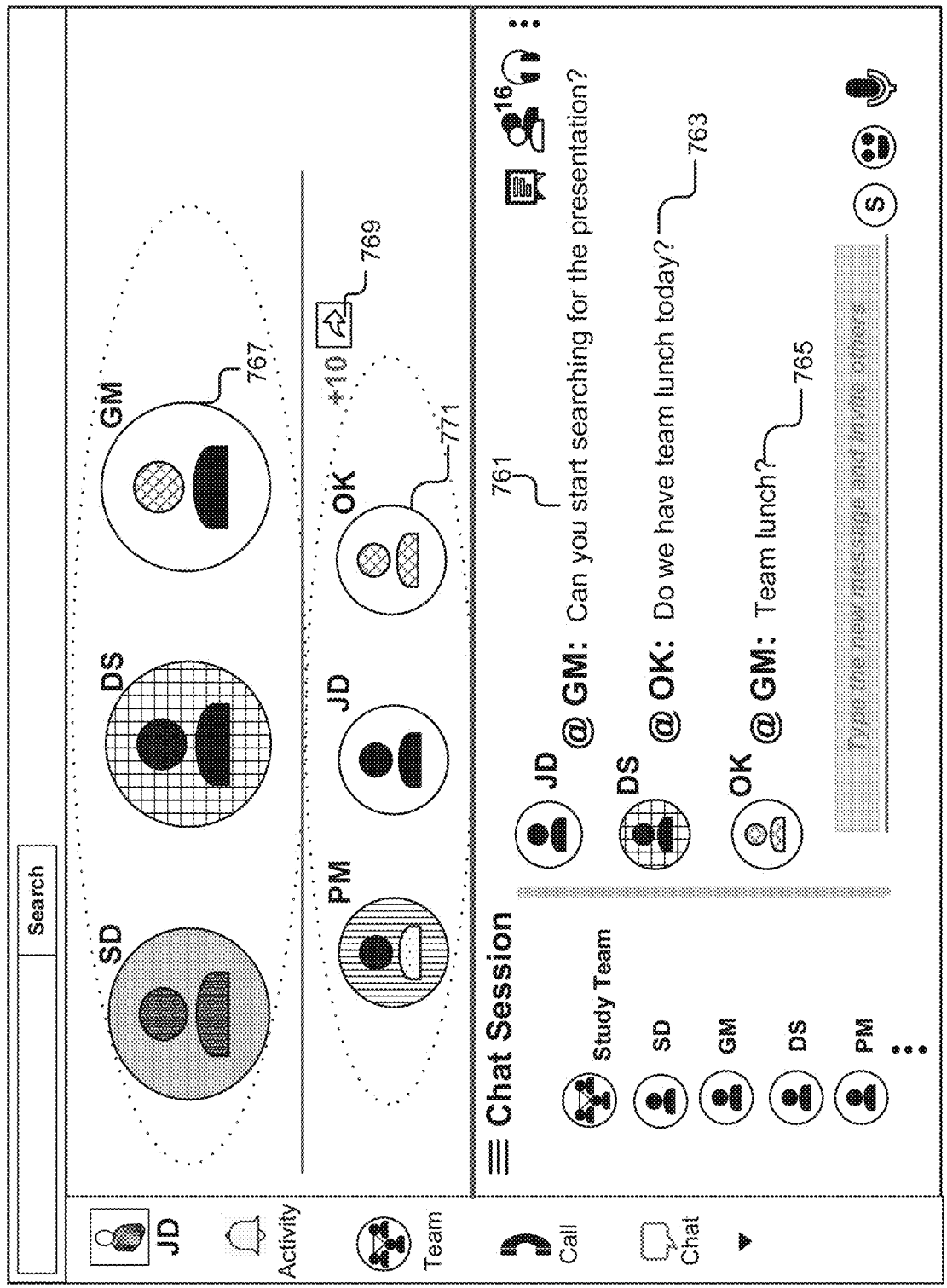
FIG. 7G is an example graphical user interface for weighing and ranking mention signals to identify a promoted user for display.

FIG. 7G is an example graphical user interface for weighing and ranking mention signals to identify a promoted user for display. In this example, there are three mention signals. JD @mentions GM about a presentation at 761, DS @mentions OK about a team lunch at 763, and OK @mentions GM about the team lunch at 765. Both OK and GM are mentioned and thus may be promoted. However, since only one participant can be promoted to a prominent location 767 of the primary area (e.g., due to a display space limitation), the decision engine 207 weighs and ranks the mention signals of OK and GM to identify the one user promoted to the prominent location 767, e.g., based on a mention frequency. Here, GM is mentioned twice and OK is mentioned once. Therefore, the decision engine 207 identifies and promotes GM to the prominent location 767 of the primary area from a location in the secondary area as shown in FIG. 6. As compared to the initial display layout shown in FIG. 6, the decision engine 207 also promotes OK by taking OK outside the overflow zone 769 to location 771 in the secondary area since the location 771 has an assigned ranking value representing a higher ranking than that represented by the assigned ranking value of the location 769.

Figure 8:
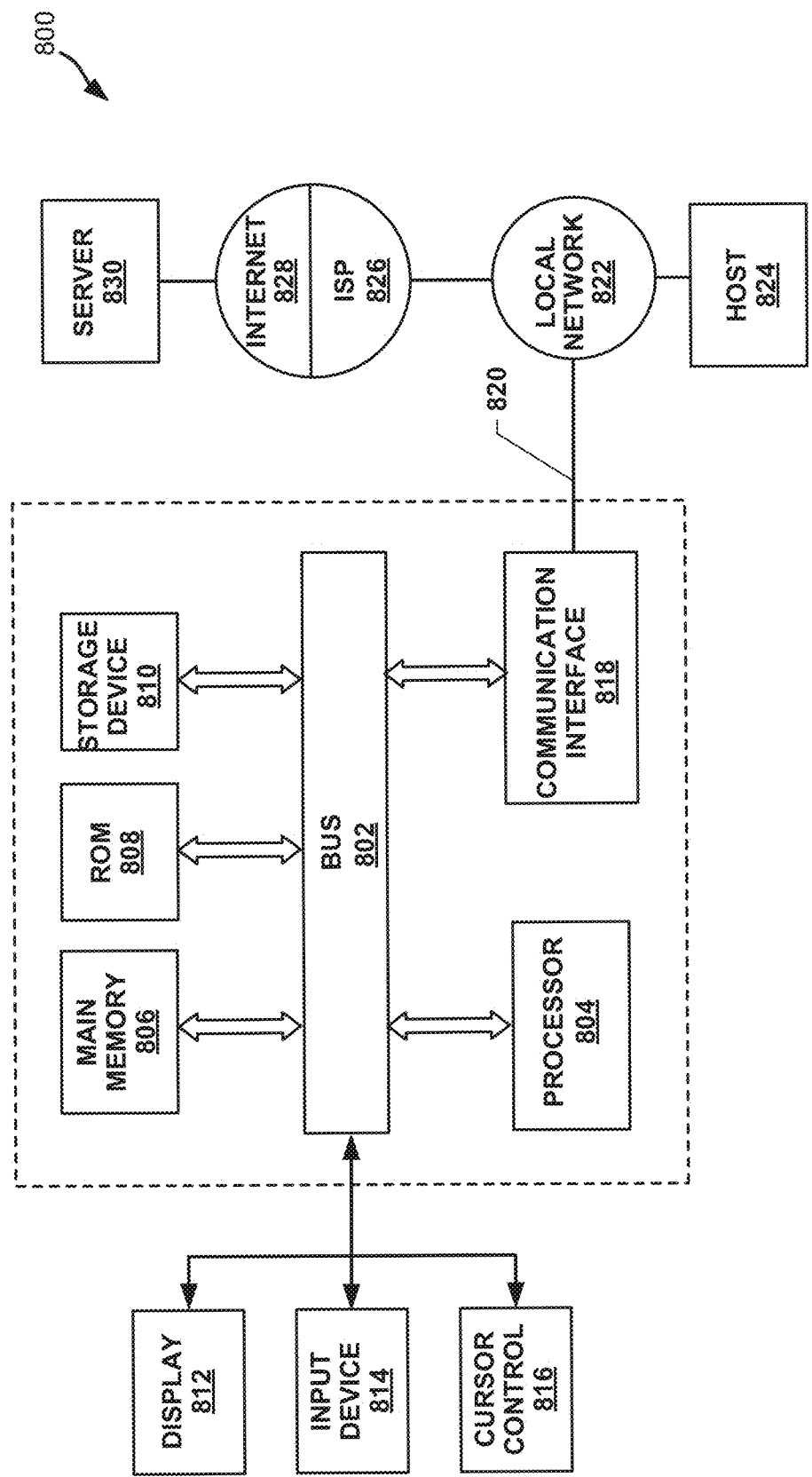
FIG. 8 is a functional block diagram of an example computer system upon which aspects of this disclosure may be implemented.

FIG. 8 is a functional block diagram of an example computer system 800 upon which aspects of this disclosure may be implemented. It will be understood that the logic blocks illustrated in FIG. 8 represent functions, and do not necessarily correspond to particular hardware on a one-to-one basis. The computer system 800 can include a data processor 804, coupled by a bus 802 to an instruction memory or main memory 806, a read-only memory 808, and a storage device 810. The instruction memory 806 can include a tangible medium retrievably storing computer-readable instructions, that when executed by the data processor 804 cause the processor to perform functions, processes, and operations described herein, for example, in reference to FIGS. 1-5.

The computer system 800 can also include a display 812, a user interface or other input device 814, and a cursor control 816, either as separate devices or combined, for example, as a touchscreen display. The computer system 800 can also include a communications interface 818, configured to interface with a local network 822 by a bus 820 for accessing a local host server 824, and to communicate through an ISP 826 to the Internet 828, and access a remote server 830.

While various implementations have been described, the description is intended to be exemplary, rather than limiting, and it is understood that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications, and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 106, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. A system for identifying and promoting a visual display of a user in an online meeting based on a mention of a username in a chat session associated with the online meeting, the system comprising:
   a processor; and
   a memory, coupled to the processor, configured to store executable instructions that, when executed by the processor, cause the processor to:
      identify a plurality of participants of an online meeting, the plurality of participants including a first participant and a second participant;
      cause a user interface for the online meeting to display on each of client devices of the participants, wherein the user interface includes a plurality of display locations, each display location being associated with an assigned ranking value representing a ranking of the display location among the plurality of display locations;
      identify, from among the plurality of display locations, a first location on the user interface at which a representation of the first participant or the second participant is displayed, the first location being associated with a first assigned ranking value;
      detect, from chat data streams for the online meeting from client devices of the participants, a first signal that the first participant has mentioned a name of the second participant in the chat session associated with the online meeting, the mentioned name being in a format including a prespecified symbol in conjunction with the name of the second participant; and
      responsive to detecting the first signal, including the prespecified symbol in conjunction with the name of the second participant, instruct one or more client devices to promote a display location of at least one of the first participant and the second participant on the user interface by moving the representation of the at least one of the first participant and the second participant from the first location for display to a second location on the user interface, wherein the second location on the user interface is associated with a second assigned ranking value representing a higher ranking than that represented by the first assigned ranking value of the first location on the user interface;
   wherein the executable instructions further include instructions that, when executed by the processor, cause the processor to:
      determine, via a decision engine of the processor, whether to promote the first participant or the second participant for a global display or a local display, wherein the global display causes a display of the promotion on a first number of the user interfaces of the client devices of the plurality of participants, and the local display causes a display of the promotion on a second number of the user interfaces of the client devices of the plurality of participants, wherein the second number is a smaller number than the first number; and identify one or more user interfaces associated with the one or more client devices based on determining whether to promote the first participant or the second participant for the global display or the local display.

2. The system of claim 1, wherein the representation is one of an image, a text, a symbol that uniquely identifies the first participant or the second participant on the user interface.

3. The system of claim 1, wherein to detect the first signal, the executable instructions further include instructions that, when executed by the processor, cause the processor to detect in the first signal that the first participant has "@name" mentioned the second participant in the chat session associated with the online meeting.

4. The system of claim 3, wherein the first location and the second location each have a unique ranking, and wherein the memory is configured to further store executable instructions that, when executed by the processor, cause the processor to identify a conversation identifier associated with the online meeting, the conversation identifier uniquely identifying the online meeting in a notification of the chat session between a chat service and a calling service implementing the chat session, and wherein, to instruct one or more of the client devices to promote the display location of the at least one of the first participant and the second participant on the user interface, the memory is configured to further store executable instructions that, when executed by the processor, cause the processor to instruct, based on the conversation identifier, the one or more client devices to promote the display location of the at least one of the first participant and the second participant on the user interface.

5. The system of claim 1, wherein to detect the first signal, the executable instructions further include instructions that, when executed by the processor, cause the processor to detect in the first signal that the first participant has "@name" mentioned the second participant in the chat session associated with the online meeting.

6. The system of claim 1, wherein the plurality of display locations are included in multiple display areas of the user interface, the display locations inside a display area share a same ranking value, and the first and second locations are located in different display areas.

7. The system of claim 1, wherein the executable instructions further include instructions that, when executed by the processor, cause the processor to:

weigh and rank the first signal; and identify the second location based on weighing and ranking the first signal.

8. The system of claim 7, wherein to weigh and rank the first signal, the executable instructions further include instructions that, when executed by the processor, cause the processor to weigh and rank the first signal based at least in part on a mention frequency within a predetermined time window of the chat session.

9. The system of claim 7, wherein to weigh and rank the first signal, the executable instructions further include instructions that, when executed by the processor, cause the processor to weigh and rank the first signal based at least in part on a positive mention context by the first participant with regard to the second participant.

10. The system of claim 7, wherein to weigh and rank the first signal, the executable instructions further include instructions that, when executed by the processor, cause the processor to weigh and rank the first signal based at least in part on a positive mention context with regard to the second participant by the first participant and at least one other participant among the plurality of participants.

11. The system of claim 7, wherein to weigh and rank the first signal, the executable instructions further include instructions that, when executed by the processor, cause the processor to weigh and rank the first signal based at least in part on a meeting flow action which is used to direct or affect a data flow of the meeting.

12. The system of claim 7, wherein to weigh and rank the first signal, the executable instructions further include instructions that, when executed by the processor, cause the processor to weigh and rank the first signal based at least in part on a message reaction by the second participant to the mention of the second participant's name by the first participant in the chat session.

13. The system of claim 1, wherein the executable instructions further include instructions that, when executed by the processor, cause the processor to:

detect a second signal that the first participant has mentioned a name of a third user in the chat session associated with the online meeting, wherein the third user is not a participant of the online meeting;

notify the third user to join the online meeting;

detect a third signal that the third user has joined the online meeting; and responsive to detecting the third signal, cause a representation of the third user to be displayed at a location on user interfaces associated with the plurality of participants.

14. The system of claim 1, wherein to determine whether to promote for the global display or the local display, the executable instructions further include instructions that, when executed by the processor, cause the processor to determine to promote the first participant or the second participant for only local display based at least in part on the first signal being detected from the chat session including only the first and second participants, an emoji reaction to the first signal, or lack of reaction to the first signal.

15. The system of claim 14, wherein both the first participant and the second participant on the user interface are promoted by moving the representations of both the first participant and the second participant from the first location for display to the second location for display on the user interface, wherein the user interface is divided into different hierarchies for displaying user representations, including a primary area and a secondary area, having in lower ranking among the different hierarchies than the primary area, and wherein the first location is in the secondary area and the second location is in the primary area so that promoting the first and second participants moves the representations of the first and second participants from the secondary area to the primary area of the user interface.

16. The system of claim 1, wherein the executable instructions further include instructions that, when executed by the processor, cause the processor to:

notify the second participant that the second participant is promoted for display on the user interface;

provide the second participant an opt-out option;

receive a confirmation or a rejection of the opt-out option from the second participant;

responsive to receiving the confirmation of the opt-out option, instruct the one or more client devices to maintain the display of the user interface; and responsive to receiving the rejection of the opt-out option, instruct the one or more client devices to move the representation of the second participant for display at the second location on the user interface.

17. The system of claim 1, wherein, to move the representation of the first participant or the second participant, the executable instructions further include instructions that, when executed by the processor, cause the processor to:
  modify the representation of the first participant or the second participant; and
  instruct the one or more client devices to display the modified representation at the second location on the user interface.

18. The system of claim 1, wherein the executable instructions, when executed by the processor, cause the processor to, responsive to detecting the first signal including the prespecified symbol in conjunction with the name of the second participant, notify the second participant that the first participant has mentioned the name of the second participant, using the symbol in conjunction with the name of the second participant, in the chat session associated with the online meeting.

19. A method for identifying and promoting a user in an online meeting based on a mention of a username in a chat session associated with the online meeting, the method comprising:
  identifying a plurality of participants of the online meeting, the plurality of participants including a first participant and a second participant;
  detecting, from data streams for the online meeting from client devices of the participants, a first signal that the first participant has mentioned a name of the second participant in the chat session associated with the online meeting;
  causing a user interface for the online meeting to display on each of the client devices, wherein the user interface includes a plurality of display locations, each display location being associated with an assigned ranking value representing a ranking of the display location among the plurality of display locations;
  identifying, from among the plurality of display locations, a first location on the user interface at which a representation of the first participant or the second participant is displayed, the first location being associated with a first assigned ranking value;
  responsive to detecting the first signal, instructing one or more client devices to promote a display location of at least one of the first participant and the second participant on the user interface by moving the representation of the at least one of the first participant and the second participant from the first location for display to a second location on the user interface, wherein the second location on the user interface is associated with a second assigned ranking value representing a higher ranking than that represented by the first assigned ranking value of the first location on the user interface;
  weighing and ranking the first signal and identifying the second location based on weighing and ranking the first signal, wherein the weighing and ranking the first signal is based at least in part on a mention frequency within a predetermined time window of the chat session;
  determining whether to promote the first participant or the second participant for a global display or a local display based upon the mention frequency within the predetermined time window of the chat session, wherein the global display causes a display of the promotion on a first number of the user interfaces of the client devices of the plurality of participants, and the local display causes a display of the promotion on a second number of the user interfaces of the client devices of the plurality of participants, which second number is a smaller number than the first number; and
  identifying one or more user interfaces associated with the one or more client devices based on determining whether to promote the first participant or the second participant for the global display or the local display.

20. The method of claim 19, wherein the representation is one of an image, a text, a symbol that uniquely identifies the first participant or the second participant on the one or more user interfaces.

21. The method of claim 19, wherein to detect the first signal, the method further comprising detecting a first signal that the first participant has "@name" mentioned the second participant in the chat session associated with the online meeting.

22. The method of claim 19, wherein to detect the first signal, the method further comprising detecting a first signal that the first participant has "@name" mentioned the second participant in the chat session associated with the online meeting.

23. The method of claim 19, wherein the first location and the second location each have a unique ranking.

24. The method of claim 19, wherein the plurality of display locations are included in multiple display areas of each of the one or more user interfaces, the display locations inside a display area share a same ranking value, and the first and second locations are located in different display areas.

25. The method of claim 19, wherein the weighing and ranking the first signal is further based at least in part on a positive mention context by the first participant with regard to the second participant.

26. The method of claim 19, wherein both the first participant and the second participant on the user interface are promoted by moving the representations of both the first participant and the second participant from the first location for display to the second location for display on the user interface, wherein the user interface is divided into different hierarchies for displaying user representations, including a primary area and a secondary area, having in lower ranking among the different hierarchies than the primary area, and wherein the first location is in the secondary area and the second location is in the primary area so that promoting the first and second participants moves the representations of the first and second participants from the secondary area to the primary area of the user interface.

27. The method of claim 19, further comprising:
  determining, via a decision engine of processor executing the method, whether to promote the first participant or the second participant for a global display or a local display based upon the mention frequency within the predetermined time window of the chat session, wherein the global display causes a display of the promotion on a first number of the user interfaces of the client devices of the plurality of participants, and the local display causes a display of the promotion on a second number of the user interfaces of the client devices of the plurality of participants, which second number is a smaller number than the first number; and
  identifying one or more user interfaces associated with the one or more client devices based on determining whether to promote the first participant or the second participant for the global display or the local display.

28. The method of claim 19, wherein the weighing and ranking the first signal is further based at least in part on a positive mention context by the first participant with regard to the second participant.

29. The method of claim 19, wherein the weighing and ranking the first signal is further based at least in part on a meeting flow action which is used to direct or affect a data flow of the meeting.

30. A system for identifying and promoting a user in an online meeting based on a mention of a username in at least one of a chat session or an audio session associated with the online meeting, the system comprising:
- a processor; and
- a memory, coupled to the processor, configured to store executable instructions that, when executed by the processor, cause the processor to:
  - identify a plurality of participants of an online meeting, the plurality of participants including a first participant and a second participant;
  - detect, from data streams for the online meeting from client devices of the participants, a first signal that the first participant has mentioned a name of the second participant in at least one of the chat session or the audio session associated with the online meeting;
  - cause a user interface for the online meeting to display on each of the client devices, wherein the user interface includes a plurality of display locations, each display location being associated with an assigned ranking value representing a ranking of the display location among the plurality of display locations;
  - identify, from among the plurality of display locations, a first location on the user interface at which a representation of the first participant or the second participant is displayed, the first location being associated with a first assigned ranking value;
  - responsive to detecting the first signal, instruct one or more client devices to promote a display location of at least one of the first participant and the second participant on the user interface by moving the representation of the at least one of the first participant and the second participant from the first location for display to a second location on the user interface, wherein the second location on the user interface is associated with a second assigned ranking value representing a higher ranking than that represented by the first assigned ranking value of the first location on the user interface,
  - notify the second participant that the second participant is promoted for display on the user interface; and
  - provide the second participant an opt-out option.

31. A method, for identifying and promoting a user in an online meeting based on a mention of a username in a chat session associated with the online meeting, the method comprising:
- identifying a plurality of participants of the online meeting, the plurality of participants including a first participant and a second participant
- detecting, from data streams for the online meeting from client devices of the participants, a first signal that the first participant has mentioned a name of the second participant in the chat session associated with the online meeting;
- causing a user interface for the online meeting to display on each of the client devices, wherein the user interface includes a plurality of display locations, each display location being associated with an assigned ranking value representing a ranking of the display location among the plurality of display locations;
- identifying, from among the plurality of display locations, a first location on the user interface at which a representation of the first participant or the second participant is displayed, the first location being associated with a first assigned ranking value;
- responsive to detecting the first signal, instructing one or more client devices to promote a display location of at least one of the first participant and the second participant on the user interface by moving the representation of the at least one of the first participant and the second participant from the first location for display to a second location on the user interface, wherein the second location on the user interface is associated with a second assigned ranking value representing a higher ranking than that represented by the first assigned ranking value of the first location on the user interface; and
- weighing and ranking the first signal and identifying the second location based on weighing and ranking the first signal, wherein the weighing and ranking the first signal is based at least in part on a mention frequency within a predetermined time window of the chat session,
- wherein the weighing and ranking the first signal is further based at least in part on a message reaction by the second participant to the mention of the second participant's name by the first participant in the chat session.

* * * * *